(12) United States Patent
Verkaik et al.

(10) Patent No.: US 10,061,664 B2
(45) Date of Patent: Aug. 28, 2018

(54) HIGH AVAILABILITY AND FAILOVER

(71) Applicant: Cisco Technology, Inc., San Jose, CA (US)

(72) Inventors: Patrick Douglas Verkaik, San Francisco, CA (US); Robert Tristan Shanks, San Mateo, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 184 days.

(21) Appl. No.: 14/598,107

(22) Filed: Jan. 15, 2015

(65) Prior Publication Data

US 2016/0210209 A1 Jul. 21, 2016

(51) Int. Cl.
G06F 11/00 (2006.01)
G06F 11/20 (2006.01)
H04L 12/46 (2006.01)

(52) U.S. Cl.
CPC .......... *G06F 11/2033* (2013.01); *G06F 11/00* (2013.01); *H04L 12/4633* (2013.01); *G06F 2201/805* (2013.01)

(58) Field of Classification Search
CPC ............. G06F 11/2005; G06F 11/2023; H04L 63/0272; H04L 69/40
See application file for complete search history.

(56) References Cited

U.S. PATENT DOCUMENTS

| | | | | |
|---|---|---|---|---|
| 5,675,723 A * | 10/1997 | Ekrot | ................. | G06F 11/2033 714/17 |
| 6,718,383 B1 * | 4/2004 | Hebert | .................... | H04L 45/22 709/221 |
| 7,266,715 B1 * | 9/2007 | Bazzinotti | ........... | H04L 63/0272 714/4.21 |
| 7,685,358 B1 * | 3/2010 | Larson | ................ | G06F 11/2023 709/216 |
| 7,886,182 B1 * | 2/2011 | Coatney | .............. | G06F 11/2028 714/11 |
| 8,432,791 B1 * | 4/2013 | Masters | .................... | H04L 1/22 370/221 |
| 2003/0233452 A1 * | 12/2003 | Maufer | ............. | H04L 29/12018 709/225 |

(Continued)

OTHER PUBLICATIONS

Cisco, "Router and VPN client for public Internet on a stcik configuration", Jun. 24, 2008, Cisco, p. 1-11.*

*Primary Examiner* — Bryce P Bonzo
*Assistant Examiner* — Jeison C Arcos
(74) *Attorney, Agent, or Firm* — Polsinelli PC

(57) ABSTRACT

Systems, methods, and computer-readable storage media for high availability and failover. A device obtains an external identity designated for a set of devices on a network, the set of devices comprising the device and a second device, and the external identity comprising public address settings which the set of devices can use when in live mode to communicate with devices outside of the network. While the device is in failover mode and the second device is in live mode, the device listens for heartbeat messages transmitted from the second device. Next, the device detects a failover event when a predetermined number of heartbeat messages have not been received by the device. In response to the failover event, the device then changes from failover mode to live mode and assumes the external identity.

20 Claims, 9 Drawing Sheets

(56) References Cited

U.S. PATENT DOCUMENTS

| | | | | |
|---|---|---|---|---|
| 2004/0010583 A1* | 1/2004 | Yu | ........................... | H04L 45/00 709/224 |
| 2004/0010731 A1* | 1/2004 | Yu | ...................... | G06F 11/2005 714/4.12 |
| 2005/0265308 A1* | 12/2005 | Barbir | ................ | H04L 12/4641 370/351 |
| 2007/0112962 A1* | 5/2007 | Lewontin | ................ | H04L 69/16 709/227 |
| 2007/0195765 A1* | 8/2007 | Heissenbuttel | ..... | H04L 12/4641 370/389 |
| 2008/0092229 A1* | 4/2008 | Khanna | ............... | H04L 63/0272 726/15 |
| 2008/0120177 A1* | 5/2008 | Moscirella | .......... | G06F 11/2023 705/14.12 |
| 2008/0162983 A1* | 7/2008 | Baba | ................... | G06F 11/0712 714/3 |
| 2009/0059837 A1* | 3/2009 | Kurk | ................... | H04L 12/4641 370/315 |
| 2009/0271655 A1* | 10/2009 | Hotta | ................ | G06F 11/2025 714/4.1 |
| 2012/0166390 A1* | 6/2012 | Merriman | ......... | G06F 17/30578 707/613 |
| 2012/0191835 A1* | 7/2012 | Blackburn | .......... | H04L 67/1002 709/223 |
| 2012/0297236 A1* | 11/2012 | Ziskind | ............... | G06F 11/1484 714/3 |
| 2013/0227672 A1* | 8/2013 | Ogg | ........................ | G06F 21/00 726/12 |
| 2013/0290249 A1* | 10/2013 | Merriman | ......... | G06F 17/30578 707/610 |

* cited by examiner

HIGH AVAILABILITY AND FAILOVER

TECHNICAL FIELD

The present technology pertains to high availability, and more specifically seamless and transparent high availability and failover for network and security appliances.

BACKGROUND

High availability and failover provide redundancy and fault tolerance. The goal is to ensure a service remains available after a failure, with minimal service disruption. Multiple devices can be connected and similarly configured to provide a specific service. Typically, multiple devices synchronize data and settings to allow active services on a primary device to be moved to a backup device when a failure occurs. This allows the backup device to resume operations previously performed by the primary device. Unfortunately, current solutions for high availability and failover require a great deal of manual configuration—both to establish an appropriate high availability and failover system and maintain the system updated and ready. Indeed, establishing a high availability system and properly synchronizing information on all relevant devices can be an extremely onerous task, particularly in larger, more complex and dynamic environments. Furthermore, current solutions for high availability and failover lack a flexible, transparent, and automated mechanism for ensuring service and communications continuity throughout a failure event.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
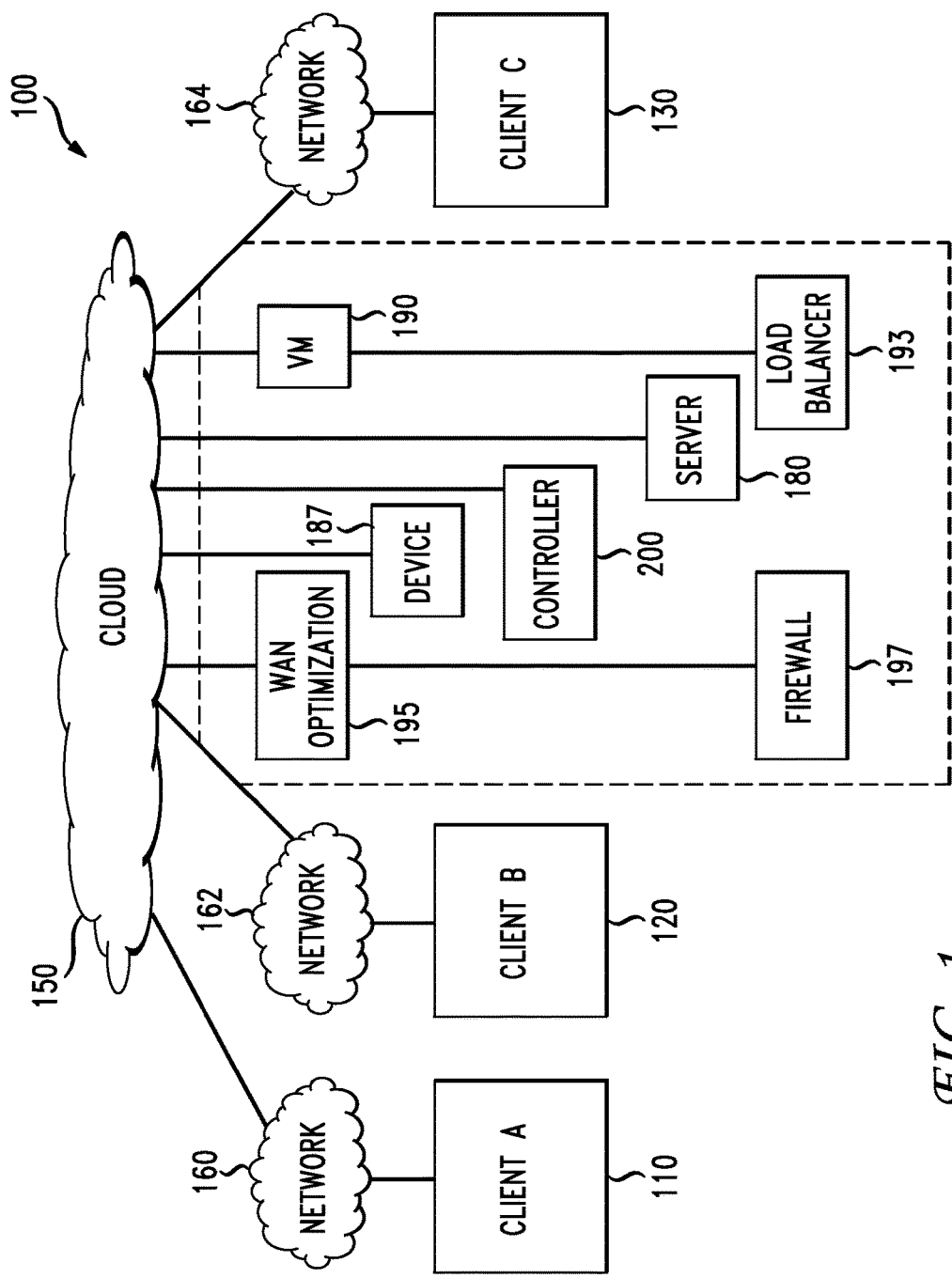
FIG. 1 illustrates a schematic block diagram of an example cloud architecture including nodes/devices interconnected by various methods of communication.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to provide flexible, transparent, and automated high availability and failover. In particular, hardware and software appliances can be configured to implement immediate, automatic, and seamless failover to avoid or minimize service disruptions after a failure. This can greatly increase service reliability and stability. High availability and failover setups can be implemented with minimal effort from the user or client by using a cloud environment to automate the setup and deployment. Indeed, the cloud environment can quickly and automatically configure and manage the various components with minimal user input. Users or clients can easily monitor status and statistics information through the cloud, and push any changes or settings directly from the cloud. The cloud environment can provide an intelligent, user-friendly mechanism to deploy and control the high availability environment, and monitor performance and functionality.

In addition, these approaches allow the network and devices to maintain a communication path with the cloud environment, which enables the cloud to setup, manage, and monitor the various components. For example, live and failover devices can maintain a virtual private network (VPN) tunnel through the cloud. The VPN tunnel can be quickly or automatically created and maintained by the cloud. The VPN tunnel can even be configured to allow seamless or immediate handoff between devices. For example, the cloud can create a VPN tunnel between the cloud and a live device, and allow a VPN tunnel handoff between devices when the specific live device changes after a failover event. Such VPN tunnel handoff ensures that a communication path between the cloud and live device is maintained notwithstanding which specific device is operating as the live device at any given time. This way, the cloud can continue to manage and monitor the live and failover devices with exceptional accuracy, continuity, and stability.

Disclosed are systems, methods, and computer-readable storage media for high availability and failover. In particular, two or more network devices can be configured to handle traffic and/or provision services in a network. The network devices can be the same or similarly configured such that the network devices can failover for each other. One device can be set as the primary device running in live mode (e.g., live device actively handling traffic and provisioning services in the network). The other device can be set as a secondary device running in failover mode (e.g., failover device). The secondary device can be active and ready to automatically and immediately failover for the primary device (e.g., switch to live mode and take control) when the primary device encounters an error or when the secondary device detects a failover event.

The primary device can continue to actively handle traffic and provision services on the network, while the secondary device remains on, active, and ready to immediately take over (i.e., failover) if a failover event occurs. While in failover mode, the secondary device can communicate within the network using its real identity (e.g., internal IP address, MAC address, device name, identifier, etc.), without actually handling network traffic and services, as that duty is assigned to the live device (i.e., the primary device). The primary device can similarly communicate within the network using its own real identity (e.g., internal IP address, MAC address, device name, identifier, etc.).

A cloud environment can generate an external identity to be shared by both devices for use in communicating with the outside of the network. Whichever device is in live mode at any given time can use the external identity to communicate with the outside. So, a live device can use the external identity to communicate with the outside until a failover event occurs and a new device becomes the live device. At that point, the new device can begin to use the external identity similarly to communicate with the outside. This sharing and seamless handoff of the external identity allows the outside of the network to communicate with any of the two devices running in live mode using a single external identity. Thus, when a failover event occurs and a new device becomes the live device, there is change in external identity. Accordingly, a failover will not disrupt services or communications with the outside. In fact, the outside can be unaware that multiple devices have used or shared the external identity.

The external identity can be a public identity. In some cases, it can include a virtual and public IP address, a virtual hardware address (e.g., MAC address), a FQDN, or any other public identifier. The devices can share the external identity and switch which device uses the external identity based on failover states: the external identity is used by the devices only when operating in live mode.

The primary and secondary devices can share heartbeat messages in order to monitor each other's status, activity, and conditions. For example, the live device can send periodic heartbeat messages to the failover device to report its health status, and the failover device can listen for heartbeat messages to detect a failover event. The failover event can be caused by an error, a packet loss, a latency, jitter, a failure, a disconnection, a disruption, or any other problem. Moreover, in some embodiments, the failover event can be detected based on the heartbeat messages. For example, the failover event can be identified by a failover device based on a failure to receive a threshold number of heartbeat messages, either consecutively or over a period of time, from the live device.

If the failover device detects a failover event, it can immediately and automatically switch to live mode and take control (e.g., handle traffic and provision services previously performed by the live device). In addition, the failover device can assign the external identity to itself and begin using it to communicate with external (i.e., public) devices or networks.

The primary and secondary devices (i.e., the live and failover devices) can maintain a tunnel with the cloud to allow the devices to report data to the cloud, such as statistics, roles, topology, performance, status information, network data, or any other type of data. The cloud can also use the tunnel to collect any other data about the devices and the network. Data reported from the devices and collected by the cloud can be used by the cloud to generate management, monitoring, and configuration pages or views for the client, for example. Further, the devices can also use the tunnel to receive data from the cloud, such as configuration settings or commands. This way, the cloud can configure specific devices and communication operations and paths automatically or with minimal effort or intervention. For example, the cloud can use the tunnel to setup a link between the devices to allow the devices to share data and synchronize information, as described further below.

In some embodiments, the tunnel to the cloud can be a VPN tunnel. Here, the devices can use their real identities to communicate with the cloud through the VPN tunnel (or any other tunnel). In addition, the devices can synchronize information, as described below, which allows the devices to share the VPN tunnel based on failover state. For example, in some cases, the VPN tunnel can be between the cloud and whichever device is operating in live mode. If a failover event occurs and the failover device switches to live mode, it can perform a seamless VPN tunnel handoff to communicate with the cloud via the VPN tunnel previously used by the live device. Such VPN tunnel handoff can be performed based on information synchronized between the devices which allows the new live device to have the necessary, up-to-date tunneling information (e.g., network address translation (NAT) state, VPN port number, security information, etc.) to maintain the VPN tunnel.

The VPN tunnel can run through the Internet to the cloud. This way, the devices can use the Internet to communicate with the cloud through a VPN tunnel. In some cases, the VPN tunnel can also be established by the cloud. For example, the cloud can collect network settings for the devices and the client network, and use that information to generate settings, such as port number and address mappings (IP mappings), for establishing the VPN tunnel. The cloud can then send the VPN tunnel settings to the devices and/or the client network to establish the VPN tunnel. This way, the cloud and devices can establish the VPN tunnel based on the settings generated by the cloud. The cloud can also automate and manage the VPN setup for the devices.

As previously indicated, the devices (i.e., the primary or live device and the secondary or failover device) can synchronize information with each other through a link between the devices. The link can be a direct or indirect link. In some cases, the link can be a tunnel. For example, the link can be a VPN tunnel. In other cases, the link can be any other type of tunnel or connection, such as a LAN connection through a switch. In some cases, the link between the devices can be configured and established by the cloud and/or the devices using settings downloaded from the cloud. For example, the cloud can generate the link settings, such as addressing and port information for example, and propagate those settings to the relevant devices in order to establish the link. Alternatively, the link between the devices can be established by another device, such as a controller, using settings generated by the cloud.

In some cases, the devices can also synchronize information with other devices in a remote network or branch. For example, the primary and secondary devices can be configured to serve a first branch, and a second set of primary and secondary devices can be configured to similarly serve a second, remote branch. If the primary and secondary devices in the first branch experience a failover event, the second set of primary and secondary devices in the second branch can take control of traffic associated with the first branch, and vice versa. This way, the primary and secondary devices in the first and second branches can provide failover for each other. To this end, the primary and secondary devices in the first and second branches can synchronize information to maintain a link between the primary and secondary devices at both branches and update status information between branches. Here, the link can be, for example, a tunnel, such as a VPN tunnel between the two branches, or any other connection between the branches. In some cases, the link can be a VPN tunnel between the primary and secondary devices at both branches. Thus, the primary and secondary devices can establish a VPN tunnel to the cloud and a second VPN tunnel to primary and secondary devices at another branch. The devices can use the VPN tunnel to the cloud to obtain the settings for establishing the VPN tunnel(s) between each other. For example, the VPN tunnel(s) between devices can be established by the cloud, as described above with respect to the link between the cloud and the devices. In some cases, the devices can establish VPN tunnels between each other in a peer-to-peer fashion.

The synchronization information (i.e., information synchronized between devices) can include information that allows the failover device to take control when switching to live mode and continue to perform the communications and operations previously performed by the live device, such as controlling the network, handling device and client traffic, communicating with the cloud, etc. For example, the synchronization information can include dynamic host configuration protocol (DHCP) information associated with the devices on the network, NAT state, VPN port number for the VPN with the cloud, and/or any other type of information and settings. The synchronization information can also include information shared between devices at different branches. For example, the synchronization information can include status information between devices at different branches, state information associated with a connection between branches, network settings associated with a link between branches, network information associated with different branch networks, or any other information synchronized between devices at different branches.

The devices can be configured to handle any type of network traffic, such as layer 2 (L2) and/or layer 3 (L3) traffic, or provision any type of services, such as network, application, or security services. The devices can also be configured to manage or implement any other type of operations, such as policy management or deployment, traffic or device management or routing, traffic or device monitoring, configurations, communications, data storage, filtering operations, load balancing operations, intrusion detection, or any other type of operations. For example, the devices can be configured as routers, firewalls, load balancers, forwarders, application delivery controllers, DHCP servers, security appliances, domain controllers, management systems, network controllers, content filtering, or any other type of device or appliance.

Such services and operations can be performed by the live device. On the other hand, the failover device can have the capabilities to perform the services and operations of the live device and immediately and automatically continue such services and operations in the case of a failover event. However, while in failover mode, the failover device can remain on and ready without actively performing such services and operations. Nevertheless, in some cases, the failover device can still communicate within the network using its real identity. For example, the failover device can communicate with the live device using its real identity. The failover device can thus synchronize information with the live device as previously explained. In some cases, the failover device can also communicate with the cloud while in failover mode. Here, the failover device can similarly use its real identity to communicate with the cloud. The failover device can thus receive settings and data from the cloud and report data and status information to the cloud.

Description

A computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points (Aps), which can effectively extend the size or footprint of the network.

Networks can be segmented into subnetworks to provide a hierarchical, multilevel routing structure. For example, a network can be segmented into subnetworks using subnet addressing to create network segments. This way, a network can allocate various groups of IP addresses to specific network segments and divide the network into multiple logical networks.

In addition, networks can be divided into logical segments called virtual networks, such as VLANs, which connect logical segments. For example, one or more LANs can be logically segmented to form a VLAN. A VLAN allows a group of machines to communicate as if they were in the same physical network, regardless of their actual physical location. Thus, machines located on different physical LANs can communicate as if they were located on the same physical LAN. Interconnections between networks and devices can also be created using routers and tunnels, such as VPN or secure shell (SSH) tunnels. Tunnels can encrypt point-to-point logical connections across an intermediate network, such as a public network like the Internet. This allows secure communications between the logical connections and across the intermediate network. By interconnecting networks, the number and geographic scope of machines interconnected, as well as the amount of data, resources, and services available to users can be increased.

Further, networks can be extended through network virtualization. Network virtualization allows hardware and software resources to be combined in a virtual network. For example, network virtualization can allow multiple numbers of VMs to be attached to the physical network via respective VLANs. The VMs can be grouped according to their respective VLAN, and can communicate with other VMs as well as other devices on the internal or external network.

To illustrate, overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Networks can include various hardware or software appliances or nodes to support data communications, security, and provision services. For example, networks can include routers, hubs, switches, APs, firewalls, repeaters, intrusion detectors, servers, VMs, load balancers, application delivery controllers (ADCs), and other hardware or software appliances. Such appliances can be distributed or deployed over one or more physical, overlay, or logical networks. Moreover, appliances can be deployed as clusters, which can be formed using layer 2 (L2) and layer 3 (L3) technologies. Clusters can provide high availability, redundancy, and load balancing for flows associated with specific appliances or nodes. A flow can include packets that have the same source and destination information. Thus, packets originating from device A to service node B can all be part of the same flow.

Endpoint groups (EPGs) can also be used in a network for mapping applications to the network. In particular, EPGs can use a grouping of application endpoints in a network to apply connectivity and policy to the group of applications. EPGs can act as a container for groups or collections of applications, or application components, and tiers for implementing forwarding and policy logic. EPGs also allow separation of network policy, security, and forwarding from addressing by instead using logical application boundaries.

Appliances or nodes, as well as clusters, can be implemented in cloud deployments. Cloud deployments can be provided in one or more networks to provision computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, network devices, applications, virtual machines (VMs), services, and so forth. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc. Also, services may include various types of services, such as monitoring services, management services, communication services, data services, bandwidth services, routing services, configuration services, wireless services, architecture services, etc.

The cloud may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. In some cases, the cloud can be include one or more cloud controllers which can help manage and interconnect various elements in the cloud as well as tenants or clients connected to the cloud.

Cloud controllers and/or other cloud devices can be configured for cloud management. These devices can be pre-configured (i.e, come "out of the box") with centralized management, layer 7 (L7) device and application visibility, real time web-based diagnostics, monitoring, reporting, management, and so forth. As such, in some embodiments, the cloud can provide centralized management, visibility, monitoring, diagnostics, reporting, configuration (e.g., wireless, network, device, or protocol configuration), traffic distribution or redistribution, backup, disaster recovery, control, and any other service. In some cases, this can be done without the cost and complexity of specific appliances or overlay management software.

Figure 2:
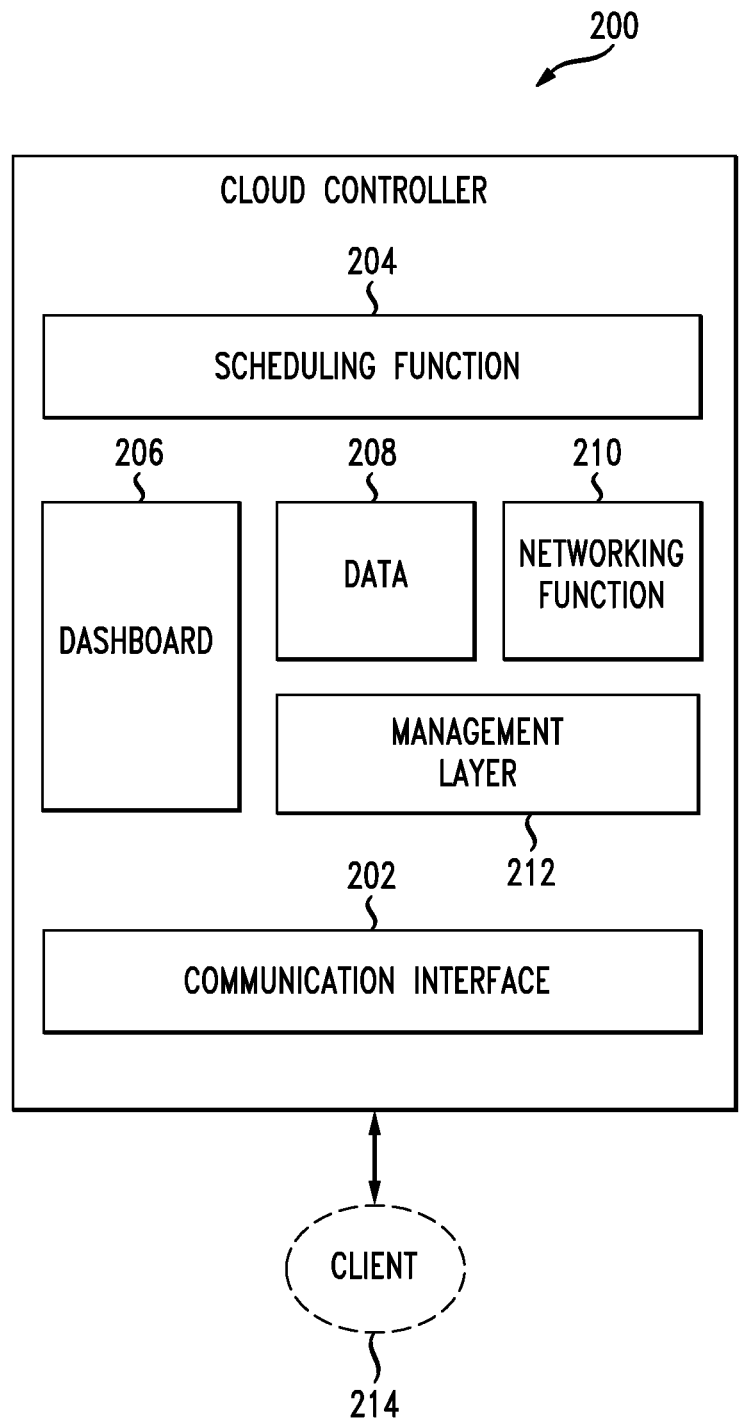
FIG. 2 illustrates a schematic block diagram of an example cloud service management system.
Figure 8:
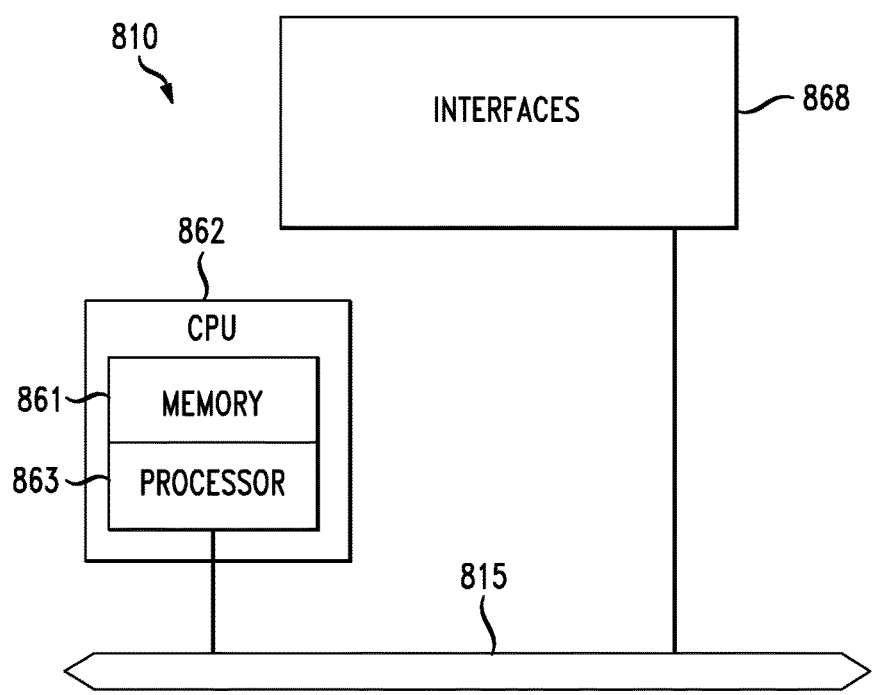
FIG. 8 illustrates an example network device.
Figure 9A:
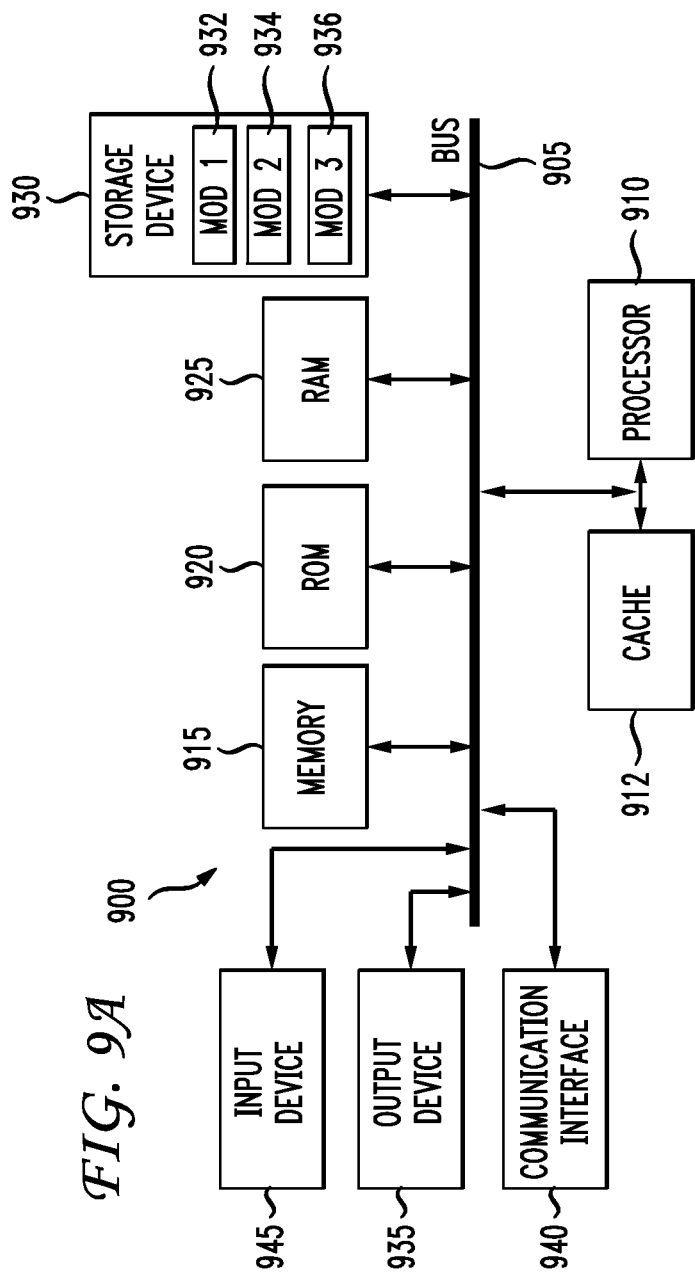
FIGS. 9A and 9B illustrate example system embodiments.
Figure 9B:
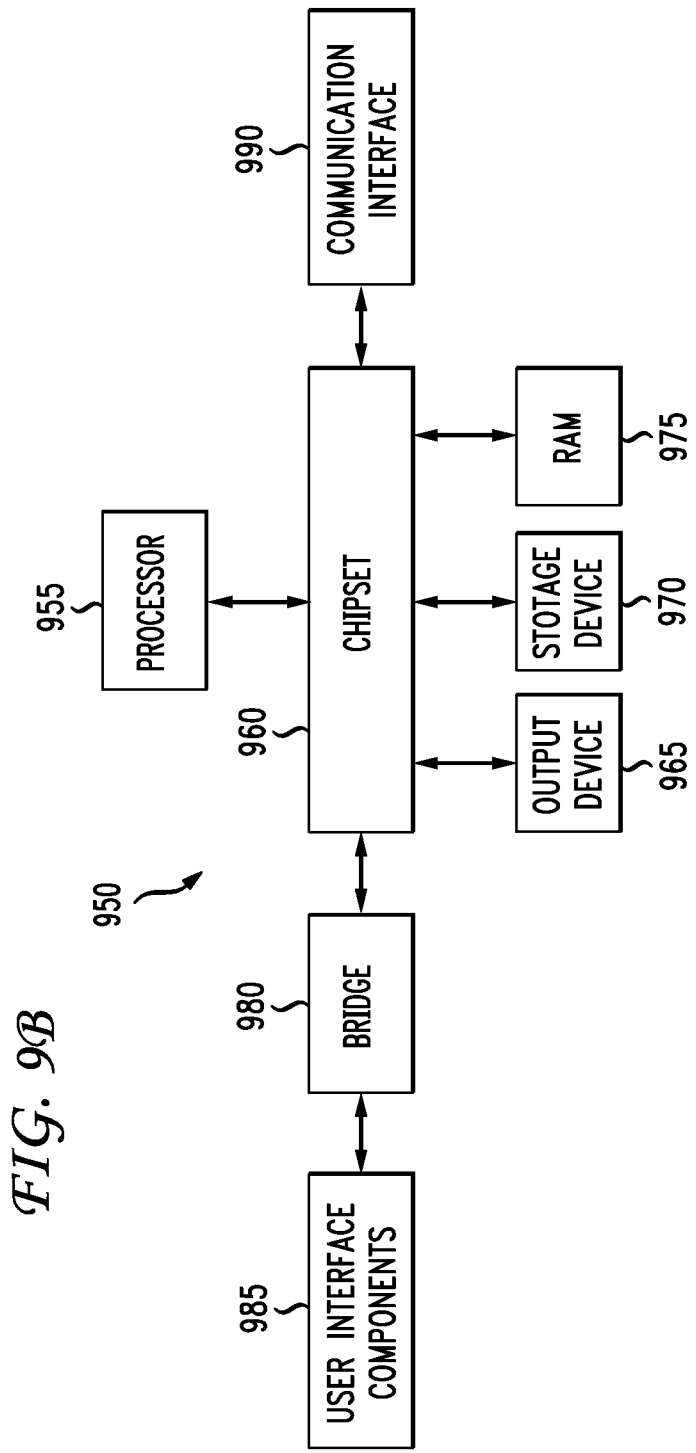

The disclosed technology addresses the need in the art for flexible, transparent, immediate, and automatic failover. Disclosed are systems, methods, and computer-readable storage media for high availability and failover. A description of cloud computing environments, as illustrated in FIGS. 1 and 2, is first disclosed herein. A discussion of high availability systems and failover concepts, including examples and variations, as illustrated in FIGS. 3-7, will the follow. The discussion then concludes with a brief description of example devices, as illustrated in FIGS. 8 and 9A-B. These variations shall be described herein as the various embodiments are set forth. The disclosure now turns to FIG. 1.

FIG. 1 illustrates a schematic block diagram of an example cloud architecture 100 including nodes/devices interconnected by various methods of communication. Cloud 150 can be a public, private, and/or hybrid cloud system. Cloud 150 can include resources, such as one or more Firewalls 197; Load Balancers 193; WAN optimization platforms 195; devices 187, such as switches, routers, intrusion detection systems, Auto VPN systems, or any hardware or software network device; servers 180, such as dynamic host configuration protocol (DHCP), domain naming system (DNS), or storage servers; virtual machines (VMs) 190; controllers 200, such as a cloud controller or a management device; or any other resource.

Cloud resources can be physical, software, virtual, or any combination thereof. For example, a cloud resource can include a server running one or more VMs or storing one or more databases. Moreover, cloud resources can be provisioned based on requests (e.g., client or tenant requests), schedules, triggers, events, signals, messages, alerts, agreements, necessity, or any other factor. For example, the cloud 150 can provision application services, storage services, management services, monitoring services, configuration services, administration services, backup services, disaster recovery services, bandwidth or performance services, intrusion detection services, VPN services, or any type of services to any device, server, network, client, or tenant.

In addition, cloud 150 can handle traffic and/or provision services. For example, cloud 150 can provide configuration services, such as auto VPN, automated deployments, automated wireless configurations, automated policy implementations, and so forth. In some cases, the cloud 150 can collect data about a client or network and generate configuration settings for specific service, device, or networking deployments. For example, the cloud 150 can generate security policies, subnetting and routing schemes, forwarding schemes, NAT settings, VPN settings, and/or any other type of configurations. The cloud 150 can then push or transmit the necessary data and settings to specific devices or components to manage a specific implementation or deployment. For example, the cloud 150 can generate VPN settings, such as IP mappings, port number, and security information, and send the VPN settings to specific, relevant device(s) or component(s) identified by the cloud 150 or otherwise designated. The relevant device(s) or component(s) can then use the VPN settings to establish a VPN tunnel according to the settings. As another example, the cloud 150 can generate and manage high availability and failover settings, as will be described below with reference to FIG. 3.

To further illustrate, cloud 150 can provide specific services for client A (110), client B (120), and client C (130). For example, cloud 150 can deploy a network or specific network components, configure links or devices, automate services or functions, or provide any other services for client A (110), client B (120), and client C (130). Other non-limiting example services by cloud 150 can include network administration services, network monitoring services, content filtering services, application control, WAN optimization, firewall services, gateway services, storage services, protocol configuration services, wireless deployment services, and so forth.

To this end, client A (110), client B (120), and client C (130) can connect with cloud 150 through networks 160, 162, and 164, respectively. More specifically, client A (110), client B (120), and client C (130) can each connect with cloud 150 through networks 160, 162, and 164, respectively, in order to access resources from cloud 150, communicate with cloud 150, or receive any services from cloud 150. Networks 160, 162, and 164 can each refer to a public network, such as the Internet; a private network, such as a LAN; a combination of networks; or any other network, such as a VPN or an overlay network.

Figure 3:
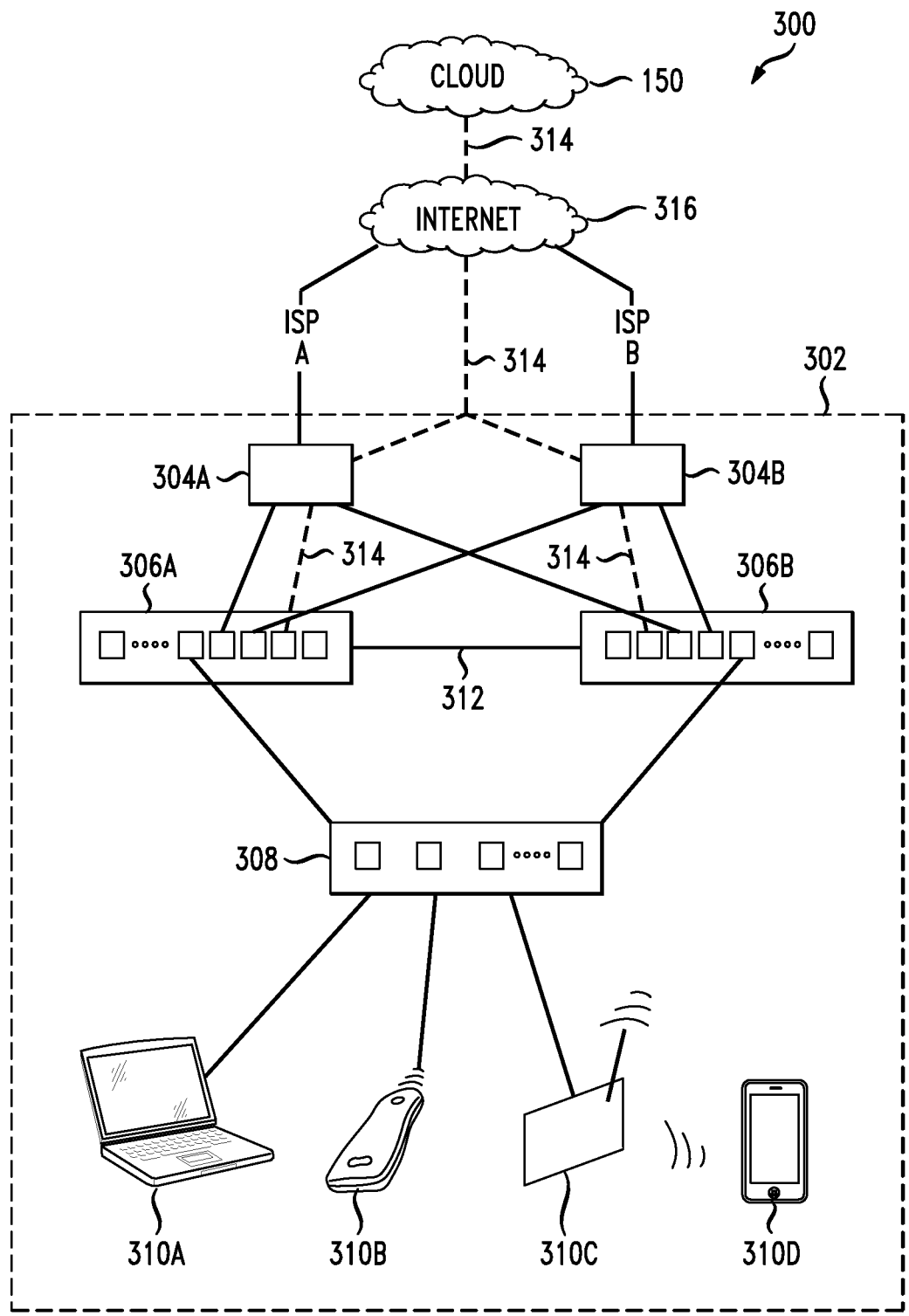
FIG. 3 illustrates an example high availability design with failover.

Moreover, client A (110), client B (120), and client C (130) can each include one or more networks. For example, (110), client B (120), and client C (130) can each include one or more LANs and VLANs. In some cases, a client can represent one branch network, such as a LAN, or multiple branch networks, such as multiple remote networks. For example, client A (110) can represent a single LAN network or branch, or multiple branches or networks, such as a branch building or office network in Los Angeles and another branch building or office network in New York. If a client includes multiple branches or networks, the multiple branches or networks can each have a designated connection to the cloud 150. For example, each branch or network can maintain a tunnel to the cloud 150. Alternatively, all branches or networks for a specific client can connect to the cloud 150 via one or more specific branches or networks. For example, traffic for the different branches or networks of a client can be routed through one or more specific branches or networks. Further, client A (110), client B (120), and client C (130) can each include one or more routers, switches, appliances, client devices, VMs, or any other devices. In some cases, client A (110), client B (120), and/or client C (130) can include primary and secondary appliances, as illustrated in FIG. 3. Each client can also maintain links between branches. For example, client A can have two branches, and the branches can maintain a link between each other.

In some cases, branches can maintain a tunnel between each other, such as a VPN tunnel. Moreover, the link or tunnel between branches can be generated and/or maintained by the cloud 150. For example, the cloud 150 can collect network and address settings for each branch and use those settings to establish a tunnel between branches. In some cases, the branches can use a respective tunnel between the respective branch and the cloud 150 to establish the tunnel between branches. For example, branch 1 can communicate with cloud 150 through a tunnel between branch 1 and cloud 150 to obtain the settings for establishing a tunnel between branch 1 and branch 2. Branch 2 can similarly communicate with cloud 150 through a tunnel between branch 2 and cloud 150 to obtain the settings for the tunnel between branch 1 and branch 2.

In some cases, cloud 150 can maintain information about each client network, in order to provide or support specific services for each client, such as failover or auto VPN services as further described below in FIG. 3. Cloud 150 can also maintain one or more links or tunnels to client A (110), client B (120), and client C (130). For example, cloud 150 can maintain a VPN tunnel to one or more devices in client A's network. In some cases, cloud 150 can configure the VPN tunnel for a client, maintain the VPN tunnel, or automatically update or establish any link or tunnel to the client or any devices of the client.

The cloud 150 can also monitor device and network health and status information for client A (110), client B (120), and client C (130). To this end, client A (110), client B (120), and client C (130) can synchronize information with cloud 150. Cloud 150 can also manage and deploy services for client A (110), client B (120), and client C (130). For example, cloud 150 can collect network information about client A and generate network and device settings to automatically deploy a service for client A. In addition, cloud 150 can update device, network, and service settings for client A (110), client B (120), and client C (130). For example, cloud 150 can send instructions to client A to trigger a device to change from failover mode to live mode, as further described below.

Those skilled in the art will understand that the cloud architecture 150 can include any number of nodes, devices, links, networks, or components. In fact, embodiments with different numbers and/or types of clients, networks, nodes, cloud components, servers, software components, devices, virtual or physical resources, configurations, topologies, services, appliances, deployments, or network devices are also contemplated herein. Further, cloud 150 can include any number or type of resources, which can be accessed and utilized by clients or tenants. The illustration and examples provided herein are for clarity and simplicity.

Moreover, as far as communications within the cloud architecture 100, packets (e.g., traffic and/or messages) can be exchanged among the various nodes and networks in the cloud architecture 100 using specific network communication protocols. In particular, packets can be exchanged using wired protocols, wireless protocols, or any other protocols. Some non-limiting examples of protocols can include protocols from the Internet Protocol Suite, such as TCP/IP; OSI (Open Systems Interconnection) protocols, such as L1-L7 protocols; routing protocols, such as RIP, IGP, BGP, STP, ARP, OSPF, EIGRP, NAT; or any other protocols or standards, such as HTTP, SSH, SSL, RTP, FTP, SMTP, POP, PPP, NNTP, IMAP, Telnet, SSL, SFTP, WIFI, Bluetooth, VTP, ISL, IEEE 802 standards, L2TP, IPSec, etc. In addition, various hardware and software components or devices can be implemented to facilitate communications both within a network and between networks. For example, switches, hubs, routers, access points (APs), antennas, network interface cards (NICs), modules, cables, firewalls, servers, repeaters, sensors, etc.

FIG. 2 illustrates a schematic block diagram of an example cloud controller 200. The cloud controller 200 can serve as a cloud service management system for the cloud 150. In particular, the cloud controller 200 can manage cloud operations, client communications, service provisioning, network configuration and monitoring, etc. For example, the cloud controller 200 can manage cloud service provisioning, such as cloud storage, media, streaming, security, or administration services. In some embodiments, the cloud controller 200 can manage client high availability systems and failover operations as further described in FIG. 3, below.

For example, the cloud controller 200 can generate an external identity, as further described below, to allow high availability (HA) client systems to share a public identity and communicate outside of the network. The cloud controller 200 can also send and receive network data from client 214 to facilitate the configuration of client devices for failover and high availability (HA), monitor network and device status information, administer client devices and networks, etc.

The cloud controller 200 can include several subcomponents, such as a scheduling function 204, a dashboard 206, data 208, a networking function 210, a management layer 212, and a communications interface 202. The various subcomponents can be implemented as hardware and/or software components. Moreover, although FIG. 2 illustrates one example configuration of the various components of the cloud controller 200, those of skill in the art will understand that the components can be configured in a number of different ways and can include any other type and number of components. For example, the networking function 210 and management layer 212 can belong to one software module or multiple separate modules. Other modules can be combined or further divided up into more subcomponents.

The scheduling function 204 can manage scheduling of procedures, events, or communications. For example, the scheduling function 204 can schedule when resources should be allocated from the cloud 150. As another example, the scheduling function 204 can schedule when specific instructions or commands should be transmitted to the client 214. In some cases, the scheduling function 204 can provide scheduling for operations performed or executed by the various subcomponents of the cloud controller 200. The scheduling function 204 can also schedule resource slots, virtual machines, bandwidth, device activity, status changes, nodes, updates, etc.

The dashboard 206 can provide a frontend where clients can access or consume cloud services. For example, the dashboard 206 can provide a web-based frontend where clients can configure client devices or networks that are cloud-managed, provide client preferences, specify policies, enter data, upload statistics, configure interactions or operations, etc. In some cases, the dashboard 206 can provide visibility information, such as views of client networks or devices. For example, the dashboard 206 can provide a view of the status or conditions of the client's network, the operations taking place, services, performance, a topology or layout, specific network devices, protocols implemented, running processes, errors, notifications, alerts, network structure, ongoing communications, data analysis, etc.

Indeed, the dashboard 206 can provide a graphical user interface (GUI) for the client 214 to monitor the client network, the devices, statistics, errors, notifications, etc., and even make modifications or setting changes through the GUI. The GUI can depict charts, lists, tables, maps, topologies, symbols, structures, or any graphical object or element. In addition, the GUI can use color, font, shapes, or any other characteristics to depict scores, alerts, or conditions. In some cases, the dashboard 206 can also handle user or client requests. For example, the client 214 can enter a service request through the dashboard 206.

The data 208 can include any data or information, such as management data, statistics, settings, preferences, profile data, logs, notifications, attributes, configuration parameters, client information, network information, and so forth. For example, the cloud controller 200 can collect network statistics from the client 214 and store the statistics as part of the data 208. In some cases, the data 208 can include performance and/or configuration information. This way, the cloud controller 200 can use the data 208 to perform management or service operations for the client 214. The data 208 can be stored on a storage or memory device on the cloud controller 200, a separate storage device connected to the cloud controller 200, or a remote storage device in communication with the cloud controller 200.

The networking function 210 can perform networking calculations, such as network addressing, or networking service or operations, such as auto VPN configuration or traffic routing. For example, the networking function 210 can perform filtering functions, switching functions, failover functions, high availability functions, network or device deployment functions, resource allocation functions, messaging functions, traffic analysis functions, port configuration functions, mapping functions, packet manipulation functions, path calculation functions, loop detection, cost calculation, error detection, or otherwise manipulate data or networking devices. In some embodiments, the networking function 210 can handle networking requests from other networks or devices and establish links between devices. In other embodiments, the networking function 210 can perform queueing, messaging, or protocol operations.

The management layer 212 can include logic to perform management operations. For example, the management layer 212 can include the logic to allow the various components of the cloud controller 200 to interface and work together. The management layer 212 can also include the logic, functions, software, and procedure to allow the cloud controller 200 perform monitoring, management, control, and administration operations of other devices, the cloud 150, the client 214, applications in the cloud 150, services provided to the client 214, or any other component or procedure. The management layer 212 can include the logic to operate the cloud controller 200 and perform particular services configured on the cloud controller 200.

Moreover, the management layer 212 can initiate, enable, or launch other instances in the cloud controller 200 and/or the cloud 150. In some embodiments, the management layer 212 can also provide authentication and security services for the cloud 150, the client 214, the controller 214, and/or any other device or component. Further, the management layer 212 can manage nodes, resources, VMs, settings, policies, protocols, communications, etc. In some embodiments, the management layer 212 and the networking function 210 can be part of the same module. However, in other embodiments, the management layer 212 and networking function 210 can be separate layers and/or modules.

The communications interface 202 allows the cloud controller 200 to communicate with the client 214, as well as any other device or network. The communications interface 202 can be a network interface card (NIC), and can include wired and/or wireless capabilities. The communications interface 202 allows the cloud controller 200 to send and receive data from other devices and networks. In some embodiments, the cloud controller 200 can include multiple communications interfaces for redundancy or failover. For example, the cloud controller 200 can include dual NICs for connection redundancy.

FIG. 3 illustrates an example high availability design 300 with failover. The design 300 can be implemented for device or service failover at a network 302 to obtain flexible, transparent, and immediate failover, as well as automated setups, configurations, and communications. The design 300 can be implemented in environments with a single WAN and/or ISP connection, dual WANs and/or dual ISP connections, and/or additional WANs and/or ISP connections. For example, the design 300 can be implemented with a single L3 device with dual WAN interfaces and dual ISP connections. However, for the sake of clarity and simplicity, the non-limiting example design 300 in FIG. 3 is illustrated using dual WANs and dual ISP connections.

The design 300 includes a network 302 connected to the Internet 316. As one of ordinary skill will readily recognize, the network 302 can also or otherwise be connected to any other public or private network in other embodiments. However, the Internet 316 is used as a non-limiting example for the sake of clarity and simplicity. The network 302 can also maintain a link 314 to the cloud 150, as will be described later. The network 302 can include one or more physical networks, virtual networks, and/or network segments. For example, the network 302 can include one or more LANs, VLANs, subnets, or overlay networks.

The network 302 can include devices 310A-D. Devices 310A-D can include, for example, client or host devices, such as personal computers or terminals (e.g., desktops, laptops, tablets, mobile phones, wireless media players, gaming systems, etc.); network devices, such as APs, routers, or switches; servers, such as media or storage servers, web servers, or file servers; virtual devices, such as VMs; clusters of devices, such as clusters of load balancing servers or multiple failover devices; or any other type of hardware or software devices.

In addition, the network 302 can include appliances 306A-B. Appliances 306A-B can refer to any software or hardware network device, such as a switch, a router, a firewall, an intrusion detection system, or any L3 device. Appliances 306A-B can be physical, software, or virtual appliances. For example, one or more of the appliances 306A-B can be a virtual router. For proper failover functionality, appliances 306A-B can be the same or substantially the same devices and/or have the same or substantially the same software and settings. However, other embodiments where appliances 306A-B are different and have different software are also contemplated herein. In such cases, the appliances 306A-B can be configured to perform the same service(s) or functionality in substantially similar ways, and/or with substantially similar performance.

The network 302 can also include a switch 308. The switch 308 can be an L2 or L3 device, as will be further described below. Moreover, switch 308 can route traffic from the devices 310A-D to the appliances 306A-B and vice versa. While switch 308 is illustrated as being connected to devices 310A-D and appliances 306A-B, other configurations are also contemplated herein. For example, in some cases, switch 308 can be connected to one or more routers, switches, networks, or any other device.

In order for the network 302 to connect to the Internet 316 (or any other outside network), the network 302 can include one or more L3 devices 304A-B (e.g., routers, gateways, switches) connected to one or more ISPs (e.g., ISP A and ISP B). To this end, L3 devices 304A-B can connect appliances 306A-B to ISPs A-B. This way, L3 devices 304A-B can provide the appliances 306A-B a path to the Internet 316 through ISPs A-B. When attached to the network 302, the L3 devices 304A-B can be configured in various ways. For example, in some cases, L3 devices 304A-B and ISPs A and B can be configured for backup or redundancy (e.g., one L3 device can be live or active while the other is off or otherwise on but in standby, backup, or listening mode). Such a setup can provide Internet or service failover or redundancy. To illustrate, if L3 device 304A is actively providing Internet connectivity through ISP A, and either L3 device 304A or ISP A subsequently goes offline or experiences an error (e.g., latency, packet loss, disconnection, etc.), then L3 device 304B can take control and maintain Internet connectivity through ISP B.

In other cases, L3 devices 304A-B and ISPs A-B can otherwise be configured to stay active and live, to implement load balancing. This way, L3 devices 304A-B and ISPs A-B can divide loads or flows (e.g., devices, services, ports, segments, domains, addresses, or any other type of load) or handle different loads or flows (i.e, assign different loads or flows to different L3 devices). For example, L3 device 304A and ISP A can be configured for use by an email service to connect to and from the Internet 316, while L3 device 304B and ISP B can be configured for use by a web service to connect to and from the Internet 316. This scenario allows traffic to be separated and distributed to different L3 devices and ISPs. In another example, L3 devices 304A-B can provision an application or service together, such that the load from the application or service is balanced or shared between the L3 devices 304A-B. This can be especially useful when dealing with intensive or critical applications. Load balancing techniques can vary. For example, load balancing can be setup based on one or more factors, such as availability, usage, history, traffic type, state, flow, prioritizing, or any other load balancing scheme.

It should be noted that the number of ISPs and/or L3 devices on the network 302 can vary in different embodiments based on one or more factors, such as cost, reliability, service and network type, network size, preferences, location, client and service requirements, etc. For example, in some cases, network 302 can have a single L3 device connected to a single ISP to handle all traffic on the network 302. This would reduce cost but may result in reduced reliability. In other cases, network 302 can have additional L3 devices and/or ISPs. For example, the network 302 can have three or more L3 devices, and each L3 device can be connected to one or more ISPs. Here, critical, sensitive, bandwidth-intense, or any other applications or services can be allocated to different L3 devices and/or ISPs, for example. In yet other cases, the network 302 can have a single L3 device but multiple ISPs (e.g., one L3 device with dual WANs). This may provide lower cost with at least some level of redundancy or traffic segregation.

Moreover, devices 310A-D can connect to the appliances 306A-B through switch 308. Appliances 306A-B can then forward traffic from the devices 310A-D to the L3 devices 304A-B, which can route the traffic to the Internet 316 through their respective ISPs A-B. Thus, the devices 310A-D can use switch 308, appliances 306A-B, and L3 devices 304A-B to communicate with the Internet 316. To illustrate, a request for an Internet resource from device 310A can be transmitted to switch 308, which can forward the request to appliance 306A or 306B, depending on which appliance is active and live. The receiving appliance (either appliance 306 or 306B) can then forward the request to one of the L3 devices 304A-B, depending on one or more factors, such as current role of the L3 devices, traffic type, destination or source address, current loads associated with the L3 devices 304A-B, timing, priorities, state, requirements, routing logic, preferences, packet or flow designation or mapping, which device is ready, which device is active and which is on standby, which device is on and which is off, or any other load balancing mechanism. The selected L3 device (either L3 device 304A or 304B) can then route the request to the Internet 316 through its corresponding ISP (i.e., ISPs A or B).

Further, the devices 310A-D and/or appliances 306A-B can connect to switch 308 either directly or indirectly. For example, devices 310A-D and/or appliances 306A-B can connect with switch 308 directly through a link, or indirectly through one or more devices, such as routers or switches. In FIG. 3, devices 310A-C and appliances 306A-B are shown directly connected to switch 308. On the other hand, device 310D is shown is connecting indirectly to switch 308 through a wireless link to device 310C. Other scenarios are also contemplated herein.

The appliances 306A-B can handle traffic received from switch 308, some of which may originate from devices 310A-D. In some embodiments, one of the appliances 306A-B can actively provision services in the network 302 (i.e., handle traffic from devices in the network 302), while the other appliance remains on, ready and/or listening but does not actively provision the services in the network 302. For example, appliance 306A can be on and actively handling traffic from the devices 310A-D, while appliance 306B can be on and monitoring appliance 306A (e.g., listening for messages, signals, or activity from appliance 306A). In some embodiments, the appliances 306A-B can be configured to run in live and failover mode: one appliance can run in live mode (i.e., can actively handle requests) while the other appliance runs in failover mode (i.e., as backup, standby, and/or failover).

When running in live mode, a live appliance can actively handle traffic from devices in the network 302 (e.g., devices 310A-D, switch 308, and/or L3 devices 304A-B) and provisioning services. For example, the live appliance can actively route traffic, filter packets, implement and execute policies, serve requests, monitor communications, control the network 302, or perform any other active operation or functionality. On the other hand, while in failover mode, the failover appliance can be on and ready to handle traffic and requests and provision services. The failover appliance can be ready to perform such operations or functions in the same or substantially similar way as the live appliance, without actually, actively performing such operations or functions. Thus, the failover appliance can allow the live appliance to actively perform its configured functions or operations (e.g., handle traffic and requests, provision services, serve devices, etc.) while remaining on and ready to immediately and automatically take control if a failover event occurs. However, while the failover appliance does not actively perform the operations or functions of live appliance, it can nevertheless monitor the live appliance for failure events and/or communicate with the cloud 150, as further described below.

A failover event can refer to an error, a packet loss, a latency, a delay, a health status, jitter, a crash, a bottleneck, missed heartbeat message(s), a threshold response time, a threshold performance, an addressing or communication error, a memory or processor status, a signal or notification, device or communication characteristics, or any other attribute or event indicative of an error, failure, or disruption. In some embodiments, the failover event can be triggered when an appliance running in live mode (i.e., 306A or 306B) fails to transmit a certain number of heartbeat messages within a specific period of time. Here, the failover appliance (i.e., 306A or 306B depending on which is running in live mode) can listen for heartbeat messages from the live appliance and trigger the failover event when it misses (i.e., fails to receive) a specific number of heartbeat messages within a specific period of time.

For example, the failover event can be triggered when the failover appliance (e.g., appliance 306A or 306B) fails to receive three (3) heartbeat messages (either consecutively or over a period of time) from the live appliance (e.g., appliance 306A or 306B depending on which is the live appliance). As one of ordinary skill in the art will readily recognize, the number of heartbeat messages missed in order to trigger a failover event can vary based on a number of factors, such as tolerance, service requirements, type of service, network performance, expected latency, etc. Similarly, the interval(s) for sending heartbeat messages can be set to any period and may vary or remain consistent over any period of time. For example, in some cases, the heartbeat messages can be transmitted every 0.1 or 0.2 seconds indefinitely or over a period. In other cases, the heartbeat messages can be transmitted every 0.1 seconds during some periods (e.g., periods of high usage), and drop the interval to every 0.3 seconds during other periods (e.g., periods of low usage).

The heartbeat messages can refer to any message, signal, notification, or communication that can be used to interpret, ascertain, or infer a health or active status or state of the sending device. For example, a heartbeat message can be a message which can be used by the receiving device to identify the sending device and an activity or status of the sending device. As another example, a heartbeat message can be a signal transmitted by a sending device which provides the identity of the sending device. A receiving device can then infer the active status of the sending device by the fact that the receiving device received a message from the sending device.

The appliances 306A-B can use the heartbeat messages to monitor and/or detect each other's active or health state or status. Accordingly, the appliances 306A-B can communicate heartbeat messages with each other at predefined intervals to monitor each other or detect failures. In some embodiments, the heartbeat messages can be communicated between the appliances 306A-B through switch 308. In other embodiments, the appliances 306A-B can communicate the heartbeat messages through a direct link between each other. In yet other embodiments, the appliances 306A-B can communicate the heartbeat messages through switch 308 and one or more additional devices, such as switches or routers.

Moreover, the heartbeat messages can be transmitted by the appliances 306A-B over a specific VLAN. In some cases, the appliances 306A-B can transmit the heartbeat messages over the same VLAN. However, in other cases, the heartbeat messages can be transmitted by the appliances 306A-B over all VLANs. This can ensure that the heartbeat messages are not lost due to configuration problems at one or more switches along the path. For example, this can ensure that improper VLAN memberships at one or more switches do not disrupt the communication of heartbeat messages. This can also avoid false positive failover events occurring as a result of failure to receive heartbeat messages resulting from configuration errors. For example, if appliance 306B is not able to receive heartbeat messages from appliance 306A due to a VLAN configuration problem at a switch, this may cause appliance 306B to erroneously think a failover event has occurred at appliance 306A based on a number of missed heartbeat messages. As a result, appliance 306B may incorrectly switch to live mode and begin handling traffic thinking that appliance 306A has experienced a failure.

Heartbeat messages can also be assigned priorities to allow the appliances 306A-B determine which appliance should take over, and which should run as failover. Priorities can be assigned based on specific factors, such as appliance identity, history, frequency, statistics, preferences, roles, or any other attributes or schemes. For example, if appliance 306A is set as a primary or master appliance (e.g., appliance set to run in live mode from the outset and/or under normal circumstances) and appliance 306B as a secondary or slave/backup appliance (e.g., appliance set to run in failover mode from the outset and/or under normal circumstances), then heartbeat messages from each respective appliance can receive different priorities. To illustrate, heartbeat messages from appliance 306A can be assigned a priority of 255 because appliance 306A is the primary appliance. On the other hand, heartbeat messages from the appliance 306B can be assigned a priority of 100 because appliance 306B is a secondary appliance. Thus, if appliance 306B stops receiving heartbeat messages from the appliance 306A, it can take control and switch to live mode. If appliance 306A is fixed and ready to take control once again, it will get priority over appliance 306B because the heartbeat messages from appliance 306B have a lower priority than appliance 306A. If other failover appliances are also attached to the network 302, the various failover appliances can determine which failover appliance should take control based on the respective priorities of their heartbeat messages. The various appliances can be selected based on a ranking, priority, cascading, or any other scheme.

To expand on the previous example, if appliance 306A goes offline and appliance 306B takes control and becomes live, when the appliance 306A is back on the network 302, appliance 306A and/or appliance 306B can compare the priority of each other's heartbeat messages to determine which appliance has a higher priority. Thus, since the heartbeat messages of appliance 306A have a higher priority than those of appliance 306B, appliance 306A can re-take control from appliance 306B and switch to live mode based on the priorities. Appliance 306B can then revert back to failover mode. Using priorities, appliances 306A-B (and any other appliance implemented in other embodiments) can have multiple failover events and role changes.

In some cases, priority information can also change based on information supplied from the cloud 150. For example, the cloud 150 can assign appliance 306A a priority of 255 when its connection to 304A is good, but 90 when its connection to 304A is bad. On the other hand, the cloud 150 can assign appliance 306B a priority of 100 when its connection to 304A is good, and 50 when its connection to 304A is bad. Thus, the priorities can depend on the specific identity of each device, as well as its connection status.

As previously mentioned, the failover event can trigger a failover between live and failover appliances (i.e., appliances 306A-B). If a live appliance experiences a failover event, the failover appliance can immediately and automatically switch to live mode and handle traffic and/or services previously-handled by the live appliance. The live appliance can then be removed from the network 302, fixed, replaced and/or otherwise switched to failover mode. When the failover appliance changes to live mode and another appliance becomes the failover appliance (i.e., runs in failover mode), the failover appliance can remain ready to take over for the appliance running in live mode in case of a failover event. Two or more appliances can switch back and forth between live and failover modes every time the failover state of the live appliance changes (i.e., when the live appliance experiences a failover event).

To illustrate, appliance 306A can be initially set as the primary appliance and appliance 306B can be initially set as the failover appliance. The primary appliance (306A) can run in live mode while the failover appliance (306B) runs in failover mode. When running in live mode, the primary appliance (306A) can actively handle traffic and provision services on the network 302. For example, the primary appliance (306A) can actively run as a primary router and handle L3 traffic from the devices 310A-D. By contrast, when running in failover mode, the secondary appliance (306B) can remain on and ready to handle the L3 traffic from the devices 310A-D, and even communicate L2 traffic within the network 302 (e.g., between the appliances 306A-B), without actually handling the L3 traffic handled by the primary appliance (306A), while the primary appliance is in live mode. While in failover mode, the secondary appliance (306B) can monitor its connection to the primary appliance (306A) and respond to L2 traffic and even communicate with the cloud 150 as will be explained. Nevertheless, the secondary appliance (306B) can remain ready but otherwise allow the primary appliance (306A) to handle L3 traffic from the network 302 (i.e., provision services and handle requests from devices in the network 302), without interfering with the primary appliance (306A) or trying to take control of the L3 traffic from the devices on the network 302.

Thus, the primary appliance (306A) can handle traffic from devices 310A-D and provision services as the primary appliance, and the secondary appliance (306B) can monitor the primary appliance (306A) and take control immediately and automatically when the secondary appliance (306B) detects a failover event at the primary appliance (306A). This way, the multiple appliances 306A-B can work together, in synchrony, to ensure that little to no disruption is experienced by the network 302 when a problem is encountered by whichever appliance is controlling the network 302, handling network traffic, or actively provisioning services.

Appliances 306A-B can respectively maintain real identities to communicate within the network 302 and/or with the cloud 150. In some cases, the real identities can be internal or private identities. Here, the internal identities can include real hardware addresses, such as MAC addresses, real IP addresses, such as internal or private IP addresses; and/or any other addressing scheme, such as domain, host, or network names. In some embodiments, each of the appliances 306A-B can maintain a real identity including their real MAC address and an internal IP address. In addition, the appliances 306A-B can share an external (i.e., public) identity to communicate with the Internet 316. The external identity can be a virtual, public identity. Moreover, the external identity can include one or more virtual hardware addresses (e.g., a virtual MAC address); one or more virtual public IP address; and/or a FQDM (fully qualified domain name).

In some cases, the external identity can be generated by the cloud 150. For example, the external identity can be generated by the cloud controller 200 or any other device(s) on the cloud 150. Here, the external identity can include a cloud-configured MAC and IP address, for example. To generate the external identity, the cloud 150 can analyze information about the network 302 and/or any of the devices in the network 302. This information can include data collected from the network 302 and/or any devices on the network 302 (e.g., L3 devices 304A-B or appliances 306A-B). For example, this information can include data, settings, statistics, or messages reported from the appliances 306A-B. The information can also include preferences, settings, or any other data provided by a user, client, or an admin.

The external identity can serve as the public identity of devices, services, and components in the network 302. For example, devices 310A-D can use the external identity as their public identity for communicating with the Internet 316. As previously indicated, appliances 306A-B can similarly use the external identity to communicate with the Internet 316. Thus, the external identity can serve as the public address for devices on the network 302.

In some embodiments, when communicating with the Internet 316, the appliances 306A-B and/or devices 310A-D can use the external identity in conjunction with their respective, real identities. For example, the public and private addressing information can be combined to generate a unique address for the specific appliance communicating with the Internet 316. Thus, the appliances 306A-B can use the external identity to communicate with the public, while using their real identities to allow traffic to be identified as belonging to the proper, corresponding appliance.

In other embodiments, the appliances 306A-B and/or devices 310A-D can communicate with the public using the public addressing information from the external identity, and having the public address or external identity mapped to their real, private address or identity so traffic is routed from the outside to the proper internal appliance or device. In some cases, routing logic and protocols can be implemented to determine which internal appliance should receive incoming traffic addressed to the public identity and which internal appliance should be associated with outgoing public traffic.

In some cases, traffic from the Internet 316 can be properly routed to the corresponding internal appliance even if the appliances 306A-B are assigned the same IP address. Here, traffic to and from the appliances 306A-B can be distinguished based on a number of factors other than the IP address, such as port number, VLAN ID, current role or status (e.g., traffic to an IP address associated with both appliances can be routed to the live appliance), domain or host names, other aspects or attributes in the respective real identities of the appliances 306A-B, proxies with logic for directing traffic, or any other attribute or logic used to route traffic, such as BGP. For example, if appliances 306A-B are assigned the same IP address, routing logic can be implemented to ensure that an IP conflict is not created, and instead, traffic is routed to a specific appliance based on which appliance is in live mode and which is in failover mode. In yet other cases, a proxy or controller can be implemented to receive traffic to the IP assigned to the appliances 306A-B and determine which appliance should receive the traffic using specific routing logic. In yet other embodiments, the appliances 306A-B can decide which appliance should receive the traffic when a same IP address is assigned to both.

Other policies, schemes, and protocols, such as Virtual Router Redundancy Protocol (VRRP), Border Gateway Protocol (BGP), group addressing, or any other present or future protocol can also be implemented to route public traffic to and from the appliances 306A-B using the external identity. For example, BGP can be used to route public traffic destined to a single, virtual IP in the external identity to the appliances 306A-B, despite the multiple L3 switches 304A-B and ISPs associated with the network 302. BGP allows a single, public identity to be implemented with multiple WANs and ISPs (e.g., dual WANs and dual ISPs). In addition, other configurations can be used to allow public traffic addressed to a single external identity to be routed to either one of the appliances 306A-B. For example, traffic addressed to the external identity can be routed through a proxy or controller in the cloud 150. The proxy or controller in the cloud 150 can then implement routing logic to determine whether traffic should be delivered to appliance 306A or 306B.

Furthermore, each of the appliances 306A-B can communicate various types of information with the cloud 150, such as status information, statistics, configuration information, activity information, error reports, role information, topology, protocols, port numbers, addressing information, NAT information, network data, device information, performance information, or any other type of information. For example, the appliances 306A-B can report their current status, activity, and history to the cloud 150. The cloud 150 can then use this information to generate a presentation on an interface for access by a client or user through the cloud 150 (e.g., through dashboard 206). As another example, the appliances 306A-B can download configuration data from the cloud 150, which they can use to implement configuration settings for communicating or otherwise establishing tunnels or communication paths, for example. In some embodiments, the appliances 306A-B can download configuration data from the cloud 150 to automatically establish one or more VPN tunnels, setup filtering or security policies, WAN optimization settings, application control settings, intrusion prevention, routing information, etc.

The appliances 306A-B can communicate with the cloud 150 via a link 314. In particular, the appliances 306A-B can use link 314 to send and receive information to and from the cloud 150. For example, the appliances 306A-B can use the link 314 to send and receive network and configuration data to and from the cloud 150, report data and statistics to the cloud 150, or share any type of information. The cloud 150 can use information received through the link 314 to generate an interface page (e.g., a page on the dashboard 206) for monitoring and managing the network 302, devices 310A-D, and/or appliances 306A-B. Users or clients can use the interface, generated by the cloud 150 based on information synchronized through the link 314, to ascertain various details and statistics. For example, through the interface, users can analyze: the current role of each of the appliances 306A-B, health status of the appliances 306A-B, performance statistics, error statistics, communication history, topology details, protocol information, and any other type of network or device data. In addition, users can use the interface generated by the cloud 150 to enter/modify/delete configuration parameters, add or remove devices, change or add information, push or download settings from the cloud 150, create or modify links or tunnels, change service or device roles, add new services, apply network changes, automate configuration procedures, or manipulate settings or devices in any other way.

The link 314 can include one or more paths or tunnels, such as an SSH or VPN tunnel. For example, the link 314 can be a VPN tunnel through the Internet 316, between the network 302 and the cloud 150. In some cases, the L3 devices 304A-B can be configured to connect a portion of the tunnel between the appliances 306A-B and the Internet 316. Here, the specific L3 devices (e.g., 304A and/or 304B) used for the tunnel can depend on specific circumstances, preferences, roles, routing logic, priorities, status, security, etc.

In some embodiments, each of the appliances 306A-B can have a respective tunnel (i.e., link 314) to the cloud 150. For example, appliance 306A can connect with the cloud 150 through a first tunnel and appliance 306B through a second tunnel. However, in other embodiments, the appliances 306A-B can share a single tunnel (i.e., link 314). For example, the cloud 150 and/or appliances 306A-B can establish a tunnel to be shared by the appliances 306A-B. Here, the appliances 306A-B can connect to the cloud 150 through the tunnel using their real identities. The appliances 306A-B can share the tunnel (i.e., link 314) based on their roles or status. For example, in some cases, the live appliance can use the tunnel to communicate with the cloud 150 and share the tunnel with the failover device when (or if) the failover device becomes the live device. Thus, the appliances 306A-B can share the VPN tunnel when they change roles or failover state.

For example, the live appliance (e.g., appliance 306A) can use the VPN tunnel to communicate with the cloud 150 using its real identity. However, when a failover event occurs and the failover appliance (e.g., secondary appliance 306B) takes control and becomes the live appliance, it can use the VPN tunnel to communicate with the cloud 150 using its real identity (i.e., MAC and IP address), as the live appliance previously did. To allow VPN handoff, the failover appliance and the live appliance can synchronize data which they can use to establish or continue the VPN tunnel and communicate with the cloud 150. Here, the appliances 306A-B can synchronize VPN port number used by the VPN tunnel, NAT state, security information, and any other type of information used to communicate through the VPN tunnel. This can allow seamless VPN handoff. The appliances 306A-B can synchronize this information, as well as other information, through link 312 as will be further described below.

Appliances 306A-B can use link 312A or 312B to communicate, synchronize data, and/or exchange heartbeat messages. However, in some cases, appliances 306A-B can communicate through 312A and use link 312B as an alternative link for failover in case, for example, a port on switch 308 used for link 312A goes down. Link 312A can be a link directly to the switch 308, or an indirect link to switch 308 which traverses one or more additional nodes. Similarly, link 312B can be a direct link, such as a direct wired or wireless connection, or an indirect link, such as a connection which traverses one or more additional nodes, such as routers or switches. In some embodiments, the link 312 can be a tunnel or pseudo tunnel.

The links 312A-B can be configured by the appliances 306A-B and/or the cloud 150. In some embodiments, the links 312A-B are configured by the cloud 150. For example, the cloud 150 can send configuration settings for establishing links 312A-B through the link 314 between the cloud 150 and the appliances 306A-B. In some cases, the cloud 150 can transmit, through link 314, TCP/IP settings, hardware address information, protocol information, commands, port numbers, routing policies and rules, security settings, VLAN information, and any other type of information to establish one or more links 312A-B between the appliances 306A-B. The appliances 306A-B can download the settings for establishing any of the links 312A-B from the cloud 150, and use the settings to establish the links 312A-B. In other cases, however, one or more links 312A-B can be established either manually or automatically by another device(s), such as a server or a controller.

Moreover, the appliances 306A-B can synchronize additional data over at least one of the links 312A-B to help support high availability and failover, and ensure the various appliances 306A-B are configured properly. For example, the appliances 306A-B can synchronize data over link 312A, such as DCHP information, network address translation (NAT) state, port number used for link 314 (e.g., VPN port number), state information, heartbeats, or any other type of data. For example, if appliance 306A is the live appliance, it can synchronize its DHCP information for the devices 310A-D with appliance 306B, so appliance 306B is updated and has the DHCP information it needs to take control if appliance 306A goes offline. The synchronization of data over link 312A or 312B can be triggered by specific events, such as configurations or information requests; schedules, such as intervals; status changes; failover state or events; state changes; updates; network or configuration changes; or any other triggering event or circumstance.

While FIG. 3 illustrates two appliances, one of ordinary skill in the art will readily recognize that additional appliances can also be added. Moreover, while failover was mostly described with respect to the appliances 306A-B, one of ordinary skill in the art will readily recognize that the failover and high availability concepts can apply to other hardware or software devices, such as L3 devices 304A-B, switches, etc. The examples in FIG. 3 are non-limiting for the sake of clarity and simplicity.

Figure 4:
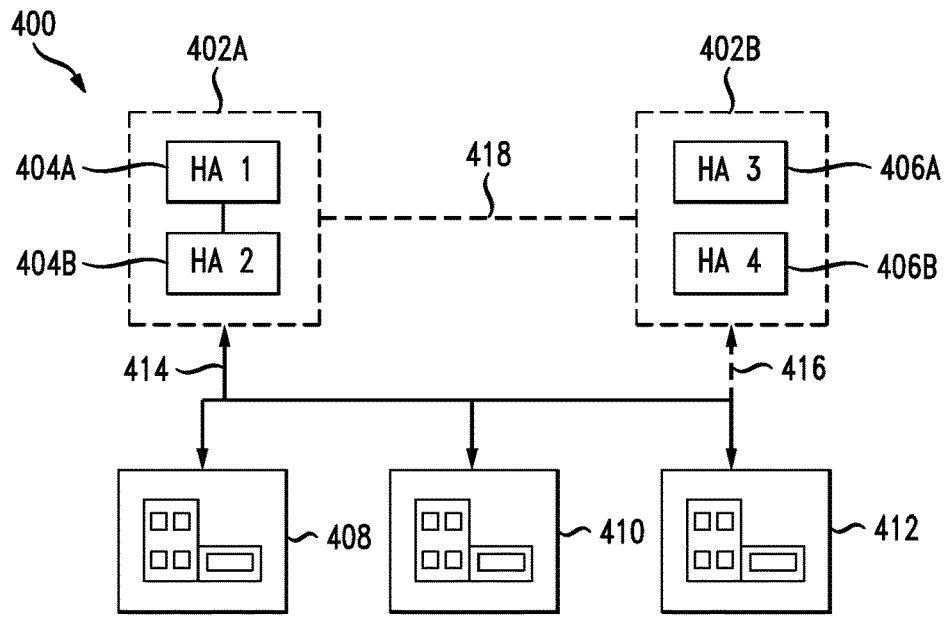
FIG. 4 illustrates an example high availability implementation in a mesh topology.

FIG. 4 illustrates an example high availability implementation in a mesh topology 400. The implementation can include datacenters 402A-B. Datacenter 402A can be a live or primary datacenter, and datacenter 402B can be a failover or secondary datacenter. Each datacenter 402A-B can include a pair of appliances 404A-D. For example, datacenter 402A can include appliances 404A-B, and datacenter 402B can include appliances 404C-D. Other implementations may include more or less appliances at each datacenter.

The appliances 404A-D can by any appliance, such as appliances 306A-B in FIG. 3. In some cases, the appliances 404A-D are configured in VPN concentrator mode. Moreover, each pair of appliances (e.g., appliances 404A-B and 404C-D) can be configured for high availability and failover as described in FIG. 3 with respect to appliances 306A-B. Accordingly, each pair of appliances can include a live or primary appliance and a failover or secondary appliance. If the live or primary appliance experiences a failover event, the failover or secondary appliance can take control and switch to become the live or primary appliance. Each pair of appliances can monitor each other's health and immediately and automatically switch roles in the event of a failover event, as previously described in FIG. 3.

In some embodiments, the appliances 404A-D and/or datacenters 402A-B can communicate with a cloud (not shown), such as cloud 150. For example, the appliances 404A-D and/or datacenters 402A-B can communicate with the cloud via a tunnel, such as a backend VPN tunnel. By communicating with the cloud, the appliances 404A-D and/or datacenters 402A-B can report information, such as network or status data or statistics, and receive settings and configuration information from the cloud.

Additionally, in some embodiments, the appliances 404A-D and/or datacenters 402A-B can maintain a link or tunnel 418 between each other. This link or tunnel 418 can be used by the appliances 404A-D and/or datacenters 402A-B to synchronize information, such as state, settings, data, topology, network information, statistics, or any other type of data. In some cases, the link or tunnel 418 can be generated at least partly by the cloud. For example, the cloud can generate the settings to allow the link or tunnel 418 to be generated.

In some cases, the appliances 404A-D and/or datacenters 402A-B can share heartbeat messages with each other using the link or tunnel 418. Based on the heartbeats, the appliances 404A-D and/or datacenters 402A-B can monitor each other's health, status, activity, or connection. Thus, if one datacenter experiences a failover event, the other datacenter can take control and become the live or primary datacenter. This way, the datacenters 402A-B can provide redundancy for branches 408-412.

Branches 408-412 can communicate with datacenter 402A via link 414. Link 414 can be a pathway from the branches 408-412 to the datacenter 402A. Link 414 can be the active or primary pathway to datacenter 402A. Thus, when datacenter 402A is operating normally and correctly, branches 408-412 can communicate with datacenter 402A through link 414.

Link 414 can include individual tunnels between datacenter 402A and each of the branches 408-412. Each tunnel can be, for example, a VPN tunnel. In some cases, each tunnel can be at least partly generated by the cloud. For example, the cloud can generate the settings for establishing the tunnels and push the settings to the datacenter 404A and/or branches 408-412.

If datacenter 402A and/or link 414 experience a failover event, branches 408-412 can reroute communications to datacenter 402B via link 416. Link 416 can be an alternative pathway that allows branches to reach a redundant datacenter (i.e., datacenter 402B). Link 416 can similarly include an individual tunnel, such as a VPN tunnel, for each of the branches 408-412. Thus, each of the branches 408-412 can connect to the datacenter 402B through their respective tunnel. Each tunnel can also be generated by the cloud, as described above with respect to the tunnels to datacenter 402A.

In some embodiments, traffic is routed through link 414 (i.e, the tunnels to datacenter 402A) or 416 (i.e., the tunnels to datacenter 402B) as determined by routing logic such as BGP. In other embodiments, traffic can be routed through link 414 or 416 depending on each datacenter's failover state: traffic is routed to the live datacenter and rerouted to the failover datacenter upon a failover event. In yet other embodiments, traffic is routed through link 414 or 416 based on a proxy or controller in the cloud. For example, traffic to the datacenters 402A-B can be addressed to a single address which points to the proxy or controller in the cloud. The proxy or controller in the cloud can then make a determination as to whether traffic should be routed through link 414 (i.e., the tunnels to datacenter 402A) link 416 (i.e., the tunnels to datacenter 402B). Such determination can depend on the role or status of each datacenter 402A-B. For example, the proxy or controller in the cloud can seek to always direct traffic to the live datacenter.

In still other embodiments, the datacenters 402A-B can monitor each other and make the determination as to which datacenter should have the active connections or tunnels to the branches 408-412. For example, datacenters 402A-B can send heartbeat messages to each other to monitor for failover events. If a failover event occurs at one datacenter, the other datacenter can automatically and immediately establish or use the corresponding tunnels (i.e., link 414 or 416) with the branches 408-412.

In some cases, the datacenters 402A-B can synchronize link information as well to allow for link (e.g., VPN) handoff. Such information can be synchronized through the link 418 between the datacenters 402A-B. The information synchronized can include, for example, NAT state, addressing information, port number(s), state, or any other relevant data.

Figure 5:
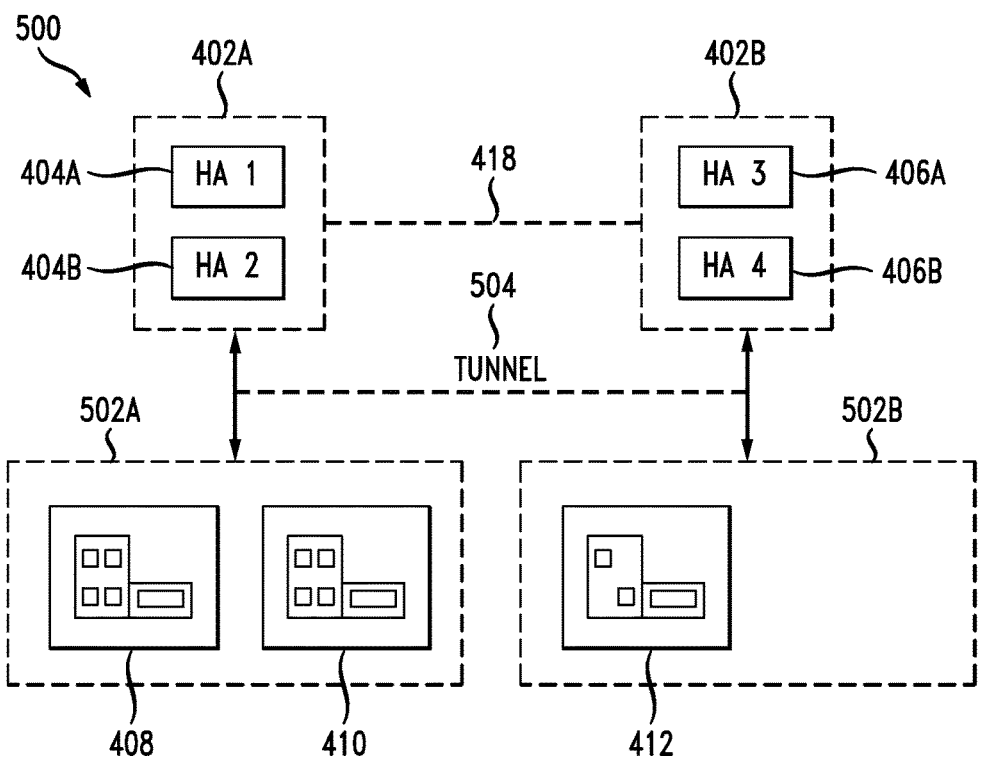
FIG. 5 illustrates an example high availability implementation in a hub-and-spoke topology.

Referring to FIG. 5, the high availability implementation can have a hub-and-spoke topology 500. Here, datacenter 402A can serve branches 408-410, and datacenter 402B can serve branch 412. In particular, branches 408-410 are tunneled to datacenter 402A, and branch 412 can be tunneled to datacenter 402B. Datacenters 402A-B can be configured as failover datacenters for the branches they do not serve. For example, datacenter 402A can be configured as failover for branch 412, and datacenter 402B can be configured as failover for branches 408-410.

Thus, if datacenter 402A experiences a failover event, branches 408-410 can be rerouted to datacenter 402B through tunnel 504. Here, datacenter 402B would then serve branches 408-412, at least until 402A is once again live. Similarly, if datacenter 402B experiences a failover event, branch 412 can be rerouted to datacenter 402A through tunnel 504.

Tunnel 504 can be, for example, one or more SSH or VPN tunnels. In addition, tunnel 504 can go through a public network, such as the Internet. Thus, traffic routed through the tunnel 504 can go through the Internet and between the branches 408, 410, or 412 and datacenters 402A or 402B. Moreover, in some embodiments, the tunnel 504 can be configured by the cloud.

In addition, the appliances 404A-D can be also configured by the cloud, a controller, or can be manually configured. In the hub-and-spoke topology 500, appliances 404A-D can be configured in VPN concentrator mode or NAT mode.

Failover scenarios in the topology 500 can follow various priorities. For example, assume the priority order for branches 408-410 are datacenter 402A and then 402B, and the concentrator priorities for branch 412 is datacenter 402B followed by datacenter 402A:

If datacenter 402A goes down completely, all connected branches (408-410) can failover to datacenter 402B.

If branch 408 cannot reach datacenter 402A but branch 410 can, then branch 408 can failover to datacenter 402B and branch 410 can continue to send traffic to datacenter 402A.

If datacenter 402A is online, and branch 408 wants to access resources on datacenter 402B (e.g., on a subnet not shared between datacenters 402A-B), branch 408 will go to datacenter 402B.

If datacenter 402A is online, and branch 408 wants to access resources on datacenter 402B (e.g., on a subnet shared between datacenters 402A-B), branch 408 will go to datacenter 402A as branch 408 has selected datacenter 402A to have priority over datacenter 402B.

If datacenter 402A is offline, and branch 408 wants to access resources on datacenter 402B (e.g., on a subnet shared between datacenters 402A-B), branch 408 will failover to datacenter 402B.

If branch 408 wants to communicate with branch 412 and both datacenters 402A-B are online, branch 408 will be able to contact branch 412 through datacenter 402A then datacenter 402B and finally branch 412.

Hub priorities can be set individually for each branch. In some cases, the priorities can be configured from the cloud 150. For example, the priorities can be configured from dashboard 206.

Figure 6:
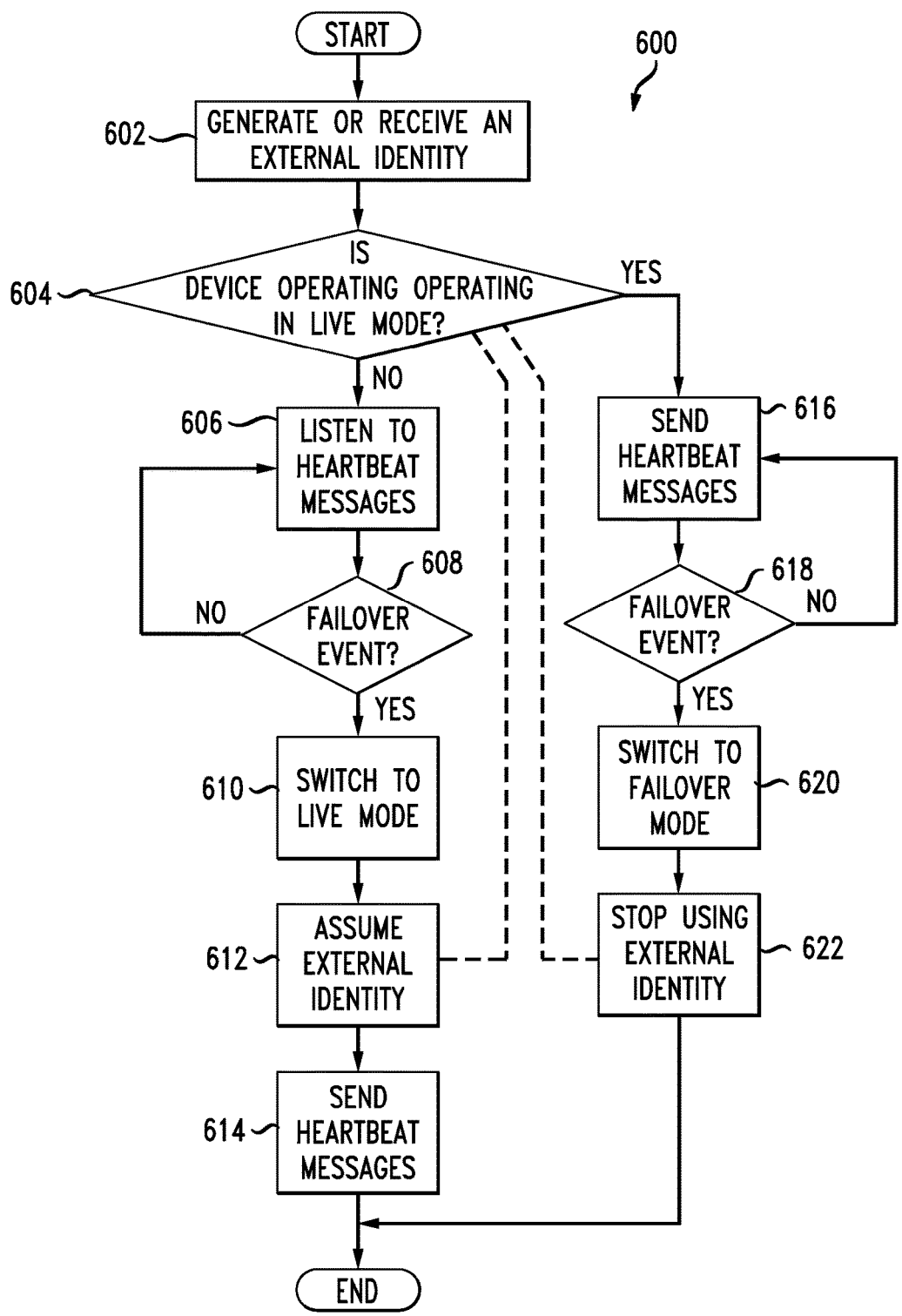
FIG. 6 illustrates an example flowchart for high availability and failover.
Figure 7:
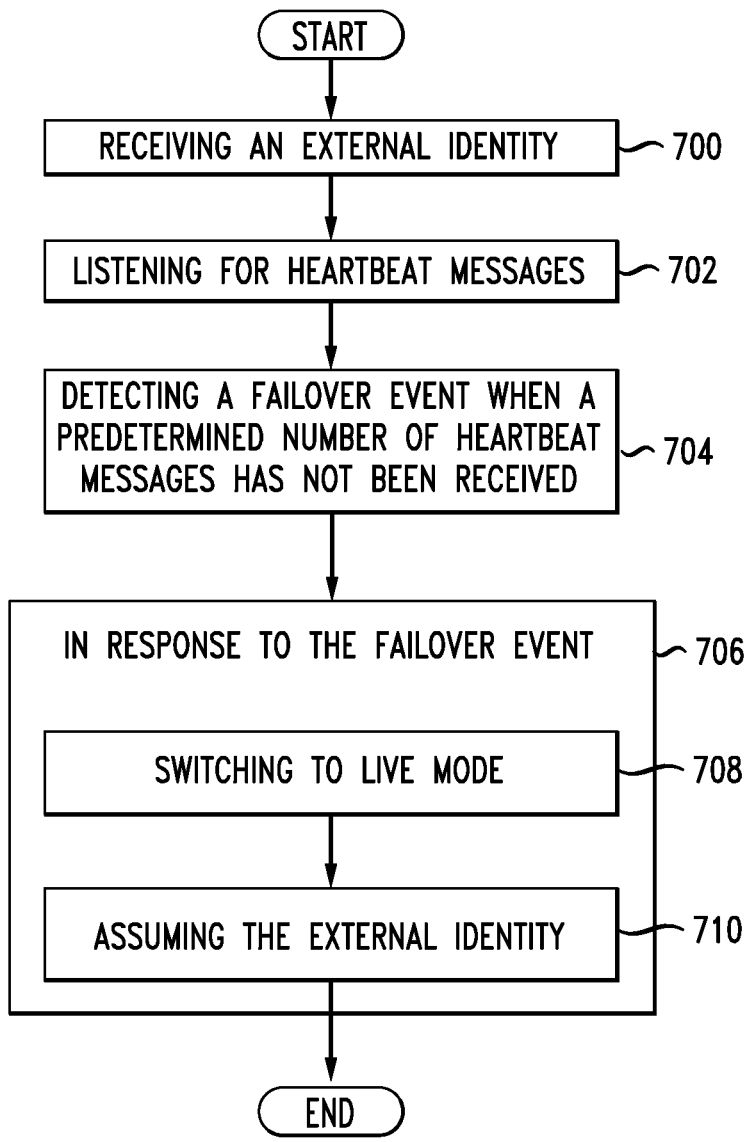
FIG. 7 illustrates an example method embodiment.

Having disclosed some basic system components and concepts, the disclosure now turns to the exemplary flowchart and method embodiments shown in FIGS. 6 and 7. For the sake of clarity, the flowchart is described in terms of a cloud 150, as shown in FIG. 1, and appliance 306A, as illustrated in FIG. 3, configured to practice the steps. The steps outlined herein are exemplary and can be implemented in any combination thereof, including combinations that exclude, add, or modify certain steps.

FIG. 6 illustrates an example flowchart 600 for failover in a high availability design. At step 602, the process can begin by generating or receiving an external identity. The external identity can be generated by the cloud 150 and received by appliance 306A. For example, the cloud 150 can generate the external identity and appliance 306A can download it through the tunnel 314.

At step 604, the appliance 306A determines if it is operating in live mode. At step 606, if the appliance 306A is not operating in live mode (i.e., appliance 306A is in failover mode), it listens to heartbeat messages. Here, appliance 306A can listen to the heartbeat messages from a live appliance, such as appliance 306B, for example.

At step 608, appliance 306A determines if a failover event has occurred. If not, appliance 306A goes back to step 606 to listen to heartbeat messages. On the other hand, if a failover event has occurred, at step 610, the appliance 306A switches to live mode. Moreover, at step 612, the appliance 306A assumes the external identity. Here, the appliance 306A assumes the external identity as a public identity for communicating with external devices (i.e., outside of the network 302). In some cases, the appliance 306A can again check if it is operating in live mode, as illustrated in step 604. Accordingly, if the appliance 306A determines that it is not operating in live mode, it can then go back to step 606.

At step 614, the appliance 306A then sends heartbeat messages to the appliance operating in failover mode. This way, the appliance operating in failover mode can monitor the appliance 306A in order to failover if appliance 306A experiences a failover event.

Going back to step 604, if the appliance 306A determines it is operating in live mode, then at step 616 the appliance 306A sends heartbeat messages to the appliance operating in failover mode (e.g., appliance 306B). As previously explained, this allows the appliance operating in failover mode to determine if a failover event has occurred at appliance 306A requiring the appliances to failover.

Then, at step 618, the appliance 306A determines if a failover event has occurred. The appliance 306A can identify a failover event from an error, a disconnection or disruption, a delay, a failure, a notification from another appliance, or any other problem or message. For example, the appliance 306A can identify a failover event from a failure to reach the failover appliance after a certain amount of time or attempts, a failure to reach the failover appliance with one or more heartbeat messages, etc. It is noteworthy, however, that in some cases, step 618 can be optional. In other words, in some cases, it may be unnecessary to have the live appliance (i.e., appliance 306A in this scenario) check for failover events. Therefore, in some embodiments, after determining that appliance 306A is operating in live mode, appliance 306A would send heartbeat messages at step 616 and simply continue to send the heartbeat messages at this step until a failover event occurs and the failover appliance failover to live mode, such that appliance 306A is no longer the live appliance.

For example, in some embodiments, if appliance 306A is in live mode, it can simply continue to send heartbeat messages without checking if a failover event has occurred. Instead, the determination of whether a failover event has occurred at the live appliance can be left to the failover appliance. More specifically, the failover appliance can listen for heartbeat messages and make a determination that a failover event has occurred when a number of heartbeat messages are not received. Here, it may be unnecessary to also require the live appliance to check if a failover event has occurred, as this would be identified by the failover appliance from the missed heartbeat messages. Thus, since it may be easier to leave that determination to only the failover appliance, in some embodiments, the live appliance may not need to perform step 618.

However, in other embodiments, the live appliance (i.e., appliance 306A in this scenario) can also perform the determination of a failover event from step 618. As previously indicated, the determination can, in some cases, simply be based on a notification from the failover appliance or an error. In any case, if the appliance 306A determines that a failover event has not occurred, it can simply continue to send heartbeat messages as illustrated in step 616. On the other hand, if the appliance 306A determines that a failover event has occurred, at step 620 it switches to failover mode. In addition, at step 622, the appliance 306A stops using the external identity. Instead, the failover appliance (e.g., appliance 306B) can use the external identity to communicate with the outside. The appliance 306A can share the external identity with the failover appliance, such that the external identity is used by the live appliance. In some cases, the appliance 306A can also check again if it is operating in live mode as illustrated at step 604. Accordingly, if the appliance 306A determines that it is not operating in live mode, it can listen for heartbeat messages at step 606. On the other hand, if the appliance 306A determines it is operating in live mode, it can send heartbeat messages in step 616. The appliance 306A can also assume the external identify once again if it determines it is operating in live mode.

The live and failover appliances can also synchronize information with each other and with the cloud, as described above in FIG. 3. Moreover, the live and failover appliances can seamlessly and immediately failover after various failover events. In addition, the live and failover appliances can share an external identity and a VPN tunnel for communicating with the cloud 150. Based on failover state, the live and failover appliances can have seamless VPN handoffs.

The disclosure now turns to the example method embodiment shown in FIG. 7. For the sake of clarity, the method is described in terms of an appliance 306B, as shown in FIG. 3, configured to practice the method. The steps outlined herein are exemplary and can be implemented in any combination thereof, including combinations that exclude, add, or modify certain steps.

Appliance 306B can receive an external identity (700). The external identity can be a public or virtual identity for communicating with the internet or an outside network. For example, the external identity can include public addressing configuration or settings, such as public TCP/IP settings, DNS settings, MAC addressing, default gateway settings, alternative gateway settings, network or device identifiers, host or domain names, port numbering, etc. In some cases, the external identity can include a public IP address and a virtual hardware address, such as a MAC address. The external identity can be shared between appliance 306B and another appliance on the network, such as appliance 306A.

Moreover, the appliance 306B can receive the external identity from a cloud, such as cloud 150 in FIG. 1, or the other appliance.

Appliance 306B and the other appliance (e.g., appliance 306B) can have similar hardware and/or software, and can both be setup to provision one or more services in the same or substantially similar way, or otherwise handle traffic in a same or substantially similar way. For example, the appliances can be the same devices configured to run the same services on the same network. As another example, the appliances can share configuration settings such that the appliances can failover for each other. To this end, the appliances can be setup as a primary or live appliance and a secondary or failover appliance. Thus, when the live appliance experiences a failover event, the failover appliance can failover and resume operations immediately and automatically.

Appliance 306B can the listen for heartbeat messages (702). Appliance 306B can listen to heartbeat messages from another appliance running in live mode. Accordingly, when listening to heartbeat messages, appliance 306B can be running in failover mode.

Next, appliance 306B detects a failover event when a predetermined number of heartbeat messages has not been received (704). For example, if appliance 306B determines that a threshold number of heartbeat messages have not been received, it can trigger a failover event.

In response to the failover event (706), the appliance 306B switches to live mode (708) and assumes the external identity (710). By switching to live mode, the appliance 306B can failover for the previously-live appliance (e.g., appliance 306A), and take control of the network and/or services controlled by the live appliance. The appliance 306B can be configured to handle traffic and services according to the live appliance so that no disruption is experienced when the failover takes place. Moreover, the switch to live mode can be immediate and automatic to avoid any disruptions to the network or services.

Further, by assuming the external identity, the appliance 306B can continue to communicate with the outside of the network (i.e., the public) without any disruptions. In fact, the public may or may not ever be aware of the failover or change in appliances, as both appliances use the same external identity when in live mode, and are able to maintain continuity in the public addressing. Services and traffic addressed to the live appliance can maintain the same public addressing configurations without change, despite the failover change between the appliances.

The appliances, including the failover and live appliance, can synchronize information with each other to maintain communication capabilities updated, state, network settings, data, and any other information updated. In some cases, the appliances can synchronize DHCP information for devices on the network, NAT state, port number for communicating with the cloud, etc. Moreover, the appliances can communicate with the cloud to receive data and settings, such as configuration settings for establishing a tunnel between the appliances, report data to allow the cloud to generate reports and management pages for the clients or users.

As previously mentioned, the appliances can also send heartbeat messages to each other to report health and status conditions. In some cases, the live appliance can send heartbeat messages to the failover appliance. However, in other cases, both appliances can send heartbeat messages to each other. In addition, when an appliance detects a failover event, it can also inform (or attempt to inform) the other appliance(s). For example, when appliance 306B detects a failover event at appliance 306A, it can try to notify appliance 306A of the failover event and/or that appliance 306B is switching or has switched to live mode. In some cases, such notification can serve as a trigger to the live appliance to switch to failover mode, stop running in live mode, or otherwise shut off.

Furthermore, in some embodiments, the cloud 150 can indicate to the appliance 306B which mode it should operate in. For example, the cloud 150 can receive status and network information from appliance 306B and/or appliance 306A, and use that information to determine which appliance should run in live mode and which appliance should run in failover mode. The cloud 150 can then send instructions to the appliance 306A and/or 306B, indicating a respective operating mode. To illustrate, the appliance 306A and/or appliance 306B can synchronize information with the cloud 150, such as status and network information. Based on that information, the cloud 150 can determine that appliance 306A has experienced a failover event and appliance 306B should run in live mode to take control from appliance 306B. The cloud 150 can also use priorities to determine which appliance should run in live mode.

Once the cloud 150 determines that appliance 306B should run in live mode, it can send instructions to appliance 306B to operate in live mode. Appliance 306B can receive the instructions and switch to live mode if appliance 306B is not already running in live mode. Moreover, the cloud 150 can also send instructions to appliance 306A (or another appliance) to run in failover mode to provide backup for appliance 306B. Further, when appliance 306A is ready to operate in live mode, the cloud 150 can send instructions to appliance 306A to run in live mode. The cloud 150 can also send instructions to appliance 306B to switch from live mode to failover mode. The cloud 150 can continue to send instructions to trigger changes in the operating mode of appliance 306A and/or appliance 306B at any time. The cloud 150 can monitor the health and status of the appliances 306A-B, as well as the health and status of network connections to and from the appliances 306A-B, in order to determine if any operating mode changes are necessary.

While the various examples above are described in terms of specific devices, such as appliances or branches, one of ordinary skill in the art will readily recognize that the concepts described herein can apply to other devices, networks, or environments. For example, the failover and high availability concepts can apply to different network or VPN topologies, different types of devices, different protocols, different types of networks, different number of steps or items, etc.

Example Devices

FIG. 8 illustrates an example network device 810 suitable for high availability and failover. Network device 810 includes a master central processing unit (CPU) 862, interfaces 868, and a bus 815 (e.g., a PCI bus). When acting under the control of appropriate software or firmware, the CPU 862 is responsible for executing packet management, error detection, and/or routing functions, such as miscabling detection functions, for example. The CPU 862 preferably accomplishes all these functions under the control of software including an operating system and any appropriate applications software. CPU 862 may include one or more processors 863 such as a processor from the Motorola family of microprocessors or the MIPS family of microprocessors. In an alternative embodiment, processor 863 is specially designed hardware for controlling the operations of router 810. In a specific embodiment, a memory 861 (such as non-volatile RAM and/or ROM) also forms part of CPU 862. However, there are many different ways in which memory could be coupled to the system.

The interfaces 868 are typically provided as interface cards (sometimes referred to as "line cards"). Generally, they control the sending and receiving of data packets over the network and sometimes support other peripherals used with the router 810. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

Although the system shown in FIG. 8 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 861) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 9A and FIG. 9B illustrate example system embodiments. The more appropriate embodiment will be apparent to those of ordinary skill in the art when practicing the present technology. Persons of ordinary skill in the art will also readily appreciate that other system embodiments are possible.

FIG. 9A illustrates a conventional system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 970 and random access memory (RAM) 975, to the processor 910. The system 900 can include a cache of high-speed memory connected directly with, in close proximity to, or integrated as part of the processor 910. The system 900 can copy data from the memory 915 and/or the storage device 930 to the cache 917 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 937, module 7 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 975, read only memory (ROM) 970, and hybrids thereof.

The storage device 930 can include software modules 937, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B illustrates an example computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. In this example, chipset 960 outputs information to output 965, such as a display, and can read and write information to storage device 970, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or 975. Further, the machine can receive inputs from a user via user interface components 985 and execute appropriate functions, such as browsing functions by interpreting these inputs using processor 955.

It can be appreciated that example systems 900 and 950 can have more than one processor 910 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

We claim:

1. A method comprising:
listening, via a first device on a network, for heartbeat messages transmitted from one or more second devices on the network, the first device operating in a failover mode and one of the one or more second devices operating in a live mode, each of the heartbeat messages transmitted by the one or more second devices as well as corresponding heartbeat messages transmitted by the first device having a respective priority associated therewith;
detecting a failover event when a number of heartbeat messages are not received from the one of the one or more second devices within a period of time;
immediately after detecting the failover event, determining whether to switch the first device from the failover mode to the live mode by comparing the respective priority associated with heartbeat messages transmitted by the first device and the respective priority associated with the heartbeats transmitted by all of the one or more second devices except the one of the one or more second devices operating in the live mode; and
obtaining, via the first device, an external identity for communicating with devices outside of the network upon determining to switch the first device from the failover mode to the live mode.

2. The method of claim 1, wherein the external identity is a virtual identity generated by a cloud system for shared use by the first device and the one or more second devices depending on which device is operating in live mode, the virtual identity comprising a public internet protocol (IP) address and a virtual media access control (MAC) address, wherein the first device is also assigned a private identity for communicating with devices within the network, the private identity comprising a private IP address and a MAC address.

3. The method of claim 1, wherein the listening for the heartbeat messages comprises receiving, from the one or more second devices, the heartbeat messages at identified intervals of time, the method further comprising sending, via the first device, the corresponding heartbeat messages when operating in live mode.

4. The method of claim 1, further comprising synchronizing data between the first device and the one of the one or more second devices, the data comprising at least one of dynamic host configuration protocol (DHCP) settings, network address translation (NAT) state, or a port number.

5. The method of claim 4, wherein the port number comprises a VPN port number associated with a VPN tunnel connecting the network to a cloud system, the VPN tunnel being shared by the first device and the one of the one or more second devices to communicate with the cloud system, the data synchronized between the first device and the one of the one or more second devices allowing for a handoff of the VPN tunnel between the first device and the one of the one or more second devices that is triggered by at least one of a failover event or a change in an operating mode of one of the first device or the one of the one or more second devices.

6. The method of claim 1, further comprising sending status information to a cloud system via a tunnel between the cloud system and the first device, wherein the status information comprises at least one of a failover state, an operating mode, or a health status, and wherein the status information is associated with at least one of the first device or the one of the one or more second devices.

7. The method of claim 1, wherein the first device listens to the heartbeat messages over one or more virtual local area networks (VLANs) configured on one or more ports on the first device, and wherein the first device receives, from the one of the one or more second devices, synchronization information for establishing a connection with a cloud system through a tunnel previously used by the one of the one or more second devices to communicate with the cloud system.

8. The method of claim 1, wherein the first device actively provisions services in the network while operating in live mode, and wherein the first device remains on but does not actively provision the services on the network while operating in failover mode, and wherein the first device reports data to a cloud system via a VPN tunnel between the cloud system and the network while operating in live mode, wherein the first device establishes the VPN tunnel to the cloud system using a VPN port number received from the one of the one or more second devices and at least one of the external identity and a private identity associated with the first device.

9. A system operating in live mode on a computer network, the system comprising:
   a processor; and
   a computer-readable storage medium having stored therein instructions which, when executed by the processor, cause the processor to perform operations comprising:
      associating an external identity generated by a cloud system with the system, the external identity comprising a public address for communicating with devices outside of the computer network;
      sending heartbeat messages to at least one failover device operating in failover mode in the computer network;
      sending the external identity to one of the at least one the failover device for use by the one of the at least one failover device to communicate with devices outside of the computer network when operating in live mode, the one of the at least one failover device being selected to operate in the live mode upon determining that a priority associated with heartbeat messages transmitted by the one of the at least one failover device is higher than a priority associated with heartbeat messages transmitted by each additional failover device available in the computer network; and
      in response to a failover event:
         switching the system from live mode to at least one of a failover mode, a standby mode, an inactive mode, or a shutoff mode; and
         disassociating the external identity with the system.

10. The system of claim 9, wherein the external identity comprises a virtual internet protocol (IP) address and a virtual media access control (MAC) address, wherein the system is assigned a private identity for communicating within the network, the private identity comprising a private IP address and a MAC address.

11. The system of claim 9, the computer-readable storage medium having stored therein instructions which, when executed by the processor, perform operations comprising: synchronizing data between the system and the one of the at least one failover device, the data comprising settings associated with a tunnel between the system and the cloud system, wherein the data is synchronized between the system and the one of the at least one failover device via a link between the system and the one of the at least one failover device established based on settings generated by the cloud system.

12. The system of claim 9, the computer-readable storage medium having stored therein instructions which, when executed by the processor, perform operations comprising sending the external identity to the one of the at least one failover device in response to at least one of a request or the failover event.

13. A non-transitory computer-readable storage medium having stored therein instructions which, when executed by a processor, cause the processor to perform operations comprising:
   receiving, via a first device on a network, heartbeat messages transmitted from one or more second devices on the network, the first device operating in a failover mode and one of the one or more second devices operating in live mode, each of the heartbeat messages transmitted by the one or more second devices as well as corresponding heartbeat messages transmitted by the first device having a respective priority associated therewith;
   synchronizing data between the first device and the one of the one or more second devices, the data comprising settings associated with a tunnel between a cloud system and the one of the one or more second devices;
   detecting a failover event when a number of heartbeat messages are not received by the first device from the one of the one or more second devices within a period of time; and
   immediately after detecting the failover event, determining whether to switch the first device from the failover mode to the live mode by comparing the respective priority associated with heartbeat messages transmitted by the first device and the respective priority associated with the heartbeats transmitted by all of the one or more second devices except the one of the one or more second devices operating in the live mode;
   associating an external identity generated by the cloud system with the first device upon determining to switch the first device from the failover mode to the live mode, the external identity comprising a public address for communicating with devices outside of the network; and
   based on the data synchronized between the first device and the one of the one or more second devices, establishing a connection with the cloud system via the tunnel to yield a tunnel handoff between the one of the one or more second devices and the first device.

14. The non-transitory computer-readable storage medium of claim 13, wherein the external identity comprises a virtual internet protocol (IP) address and a virtual hardware address, wherein the first device is assigned a private identity for communicating within the network, the private identity comprising a private IP address and a hardware address.

15. The non-transitory computer-readable storage medium of claim 13, wherein the data is synchronize between the first device and the one of the one or more second devices via a link between the first device and the one of the one or more second devices, the link being established based on settings received from the cloud system.

16. The non-transitory computer-readable storage medium of claim 13, wherein the tunnel comprises a VPN tunnel and wherein the data comprises VPN port settings, wherein the first device uses the VPN port settings to establish the VPN tunnel with the cloud system.

17. A system comprising:
a processor; and
a computer-readable storage medium having stored therein instructions which, when executed by the processor, cause the processor to perform operations comprising:
receiving heartbeat messages transmitted from a live device on a network, the heartbeat messages comprising a priority associated with the live device, the system operating in failover mode on the network and the live device operating in live mode on the network;
detecting a failover event when a number of the heartbeat messages are not received from the live device within a period of time;
in response to the failover event, switching the system from failover mode to the live mode;
obtaining an external identity for communicating with devices outside of the network, the external identify being previously used by the live device when operating in live mode;
upon the live device becoming active again after the failover event, comparing the priority of the live device with a priority of the system; and
switching the system from the live mode to the failover mode if the priority of the live device is greater than the priority of the system, the live device resuming operation in the live mode after the switching of the system to the failover mode.

18. The system of claim 17, wherein the external identity is a virtual identity generated by a cloud system, the virtual identity comprising a public internet protocol (IP) address and a virtual media access control (MAC) address, wherein the system is also assigned a private identity for communicating with devices within the network, the private identity comprising a private IP address and a MAC address.

19. The system of claim 17, wherein the system and the live device synchronize data via a link between the system and the live device, wherein the link is established based on settings received from a cloud system, and wherein the computer-readable storage medium stores additional instructions which, when executed by the processor, cause the processor to perform an operation comprising:
in response to the failure event, performing a VPN tunnel handoff between the system and the live device to establish a connection between the system and the cloud system based on a VPN tunnel previously established between the cloud system and the live device, the VPN tunnel being established based on the data synchronized via the link between the system and the live device, the data comprising at least one of a VPN port number or NAT state.

20. The method of claim 1, further comprising:
receiving an indication that the one of the one or more second devices is ready to resume operation in the live mode;
upon receiving the indication, switching the one of the one or more second devices from operating in the failover mode to operating in the live mode if the priority indicated in the heartbeat messages of the one of the one or more second devices is greater than the priority indicated by the heartbeat messages of first device.

* * * * *